US011546664B2

(12) United States Patent
Park

(10) Patent No.: US 11,546,664 B2
(45) Date of Patent: Jan. 3, 2023

(54) DIGITAL DEVICE TRANSMITTING MENU DATA TO AN EXTERNAL DEVICE, AND CONTROL METHOD THEREOF

(71) Applicant: LG ELECTRONICS INC., Seoul (KR)

(72) Inventor: Chala Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/761,340

(22) PCT Filed: Aug. 23, 2016

(86) PCT No.: PCT/KR2016/009334
§ 371 (c)(1),
(2) Date: Mar. 19, 2018

(87) PCT Pub. No.: WO2017/047942
PCT Pub. Date: Mar. 23, 2017

(65) Prior Publication Data
US 2018/0270442 A1    Sep. 20, 2018

(30) Foreign Application Priority Data

Sep. 18, 2015 (KR) .................... 10-2015-0132423

(51) Int. Cl.
*H04N 21/47* (2011.01)
*H04N 21/4402* (2011.01)
(Continued)

(52) U.S. Cl.
CPC .......... *H04N 21/47* (2013.01); *G06F 3/0482* (2013.01); *G06F 3/04886* (2013.01);
(Continued)

(58) Field of Classification Search
CPC ............. H04N 21/47; H04N 21/42204; H04N 21/41265; H04N 21/440263;
(Continued)

(56) References Cited

U.S. PATENT DOCUMENTS

2007/0216667 A1\* 9/2007 Matsuda .......... H04N 21/41265
345/204
2008/0059533 A1\* 3/2008 Krikorian ........ H04N 21/41407
(Continued)

FOREIGN PATENT DOCUMENTS

CN          1947410         4/2007
CN          101027904       8/2007
(Continued)

OTHER PUBLICATIONS

PCT International Application No. PCT/KR2016/009334, Written Opinion of the International Searching Authority dated Dec. 7, 2016, 27 pages.
(Continued)

*Primary Examiner* — John W Miller
*Assistant Examiner* — Humam M Satti
(74) *Attorney, Agent, or Firm* — Lee, Hong, Degerman, Kang & Waimey PC

(57) ABSTRACT

In the present specification, a digital device and a method of processing data in said digital device are disclosed. Here, a digital device according to an embodiment of the present invention comprises: a memory; a user interface unit that receives a menu request signal through a remote application executed in an external device; a display unit that displays an executed application; and a control unit that determines the properties of the received menu request signal on the basis of the application being displayed and generates menu data, implements controlling to transmit the generated menu data to the external device and output the menu data through (Continued)

(a)

(b)

a screen of the external device, and when a menu item selection signal of the menu output from the external device is received, implements controlling to transmit or activate menu data corresponding to the menu item selection signal.

5 Claims, 20 Drawing Sheets

(51) Int. Cl.
| | |
|---|---|
| H04N 21/422 | (2011.01) |
| H04N 21/482 | (2011.01) |
| H04N 21/431 | (2011.01) |
| H04N 21/436 | (2011.01) |
| H04N 21/81 | (2011.01) |
| G06F 3/04886 | (2022.01) |
| H04N 21/41 | (2011.01) |
| H04M 1/72412 | (2021.01) |
| G06F 3/0482 | (2013.01) |
| H04N 21/478 | (2011.01) |

(52) U.S. Cl.
CPC .. *H04M 1/72412* (2021.01); *H04N 21/41265* (2020.08); *H04N 21/4222* (2013.01); *H04N 21/42204* (2013.01); *H04N 21/4314* (2013.01); *H04N 21/43615* (2013.01); *H04N 21/440263* (2013.01); *H04N 21/482* (2013.01); *H04N 21/8173* (2013.01); *H04N 21/42228* (2013.01); *H04N 21/478* (2013.01)

(58) Field of Classification Search
CPC ........... H04N 21/4126; H04N 21/4222; H04N 21/4314; H04N 21/43615; H04N 21/8173; H04N 21/478; H04N 21/42228; H04N 21/436; H04N 21/43622; H04N 21/4622; H04N 21/485–21/488; H04N 21/482–21/4828; H04N 21/472–21/4722; H04N 21/431; H04N 21/433; H04M 1/72412; G06F 3/04886; G06F 3/0482; G06F 1/1692; G06F 3/048–3/04897; G06F 15/0225; G06F 15/0208; G06F 16/168; G06F 2206/1008; H03J 9/00

See application file for complete search history.

(56) References Cited

U.S. PATENT DOCUMENTS

| | | | | |
|---|---|---|---|---|
| 2008/0196068 | A1* | 8/2008 | Tseng | H04N 5/775 725/62 |
| 2009/0199230 | A1* | 8/2009 | Kumar | G06Q 30/0268 725/32 |
| 2010/0245680 | A1* | 9/2010 | Tsukada | H04N 21/41265 348/734 |
| 2012/0033140 | A1 | 2/2012 | Xu | |
| 2012/0084662 | A1* | 4/2012 | Navarro | H04N 21/4227 715/740 |
| 2012/0117511 | A1* | 5/2012 | Agnihotri | H04N 21/47 715/810 |
| 2012/0131098 | A1* | 5/2012 | Wood | G06F 3/0482 709/203 |
| 2013/0004145 | A1* | 1/2013 | Li | H04N 21/4222 386/343 |
| 2013/0050093 | A1 | 2/2013 | Kim et al. | |
| 2013/0176415 | A1 | 7/2013 | Kim et al. | |
| 2013/0263026 | A1* | 10/2013 | Enami | H04N 21/4753 715/761 |
| 2014/0032635 | A1* | 1/2014 | Pimmel | H04N 21/44227 709/203 |
| 2014/0109144 | A1* | 4/2014 | Asnis | H04N 21/482 725/38 |
| 2014/0111699 | A1* | 4/2014 | Kim | H04N 21/475 348/734 |
| 2014/0201609 | A1 | 7/2014 | Ryu | |
| 2014/0310742 | A1* | 10/2014 | Kim | H04N 21/42204 725/30 |
| 2015/0015508 | A1 | 1/2015 | Song et al. | |
| 2015/0128050 | A1* | 5/2015 | Cormican | H04N 21/4307 715/734 |
| 2015/0373123 | A1* | 12/2015 | Warrick | H04L 67/32 709/228 |

FOREIGN PATENT DOCUMENTS

| | | |
|---|---|---|
| KR | 100782064 | 4/2007 |
| KR | 1020110077315 | 7/2011 |
| KR | 1020120112362 | 10/2012 |
| KR | 1020130045480 | 6/2013 |

OTHER PUBLICATIONS

European Patent Office Application Serial No. 16846763.7, Search Report dated Jan. 31, 2019, 10 pages.

The State Intellectual Property Office of the People's Republic of China Application Serial No. 201680063552.4, Office Action dated Apr. 2, 2020, 7 pages.

* cited by examiner

FIG. 3
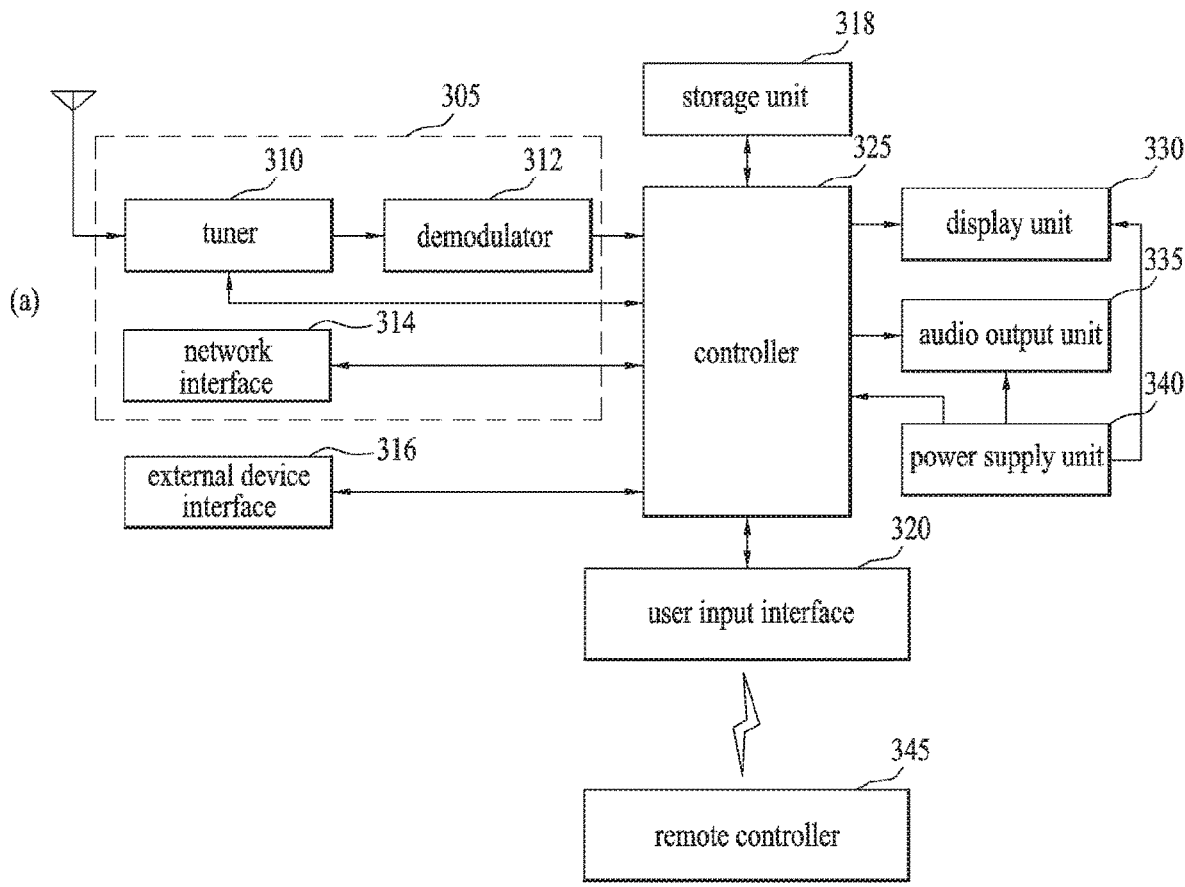
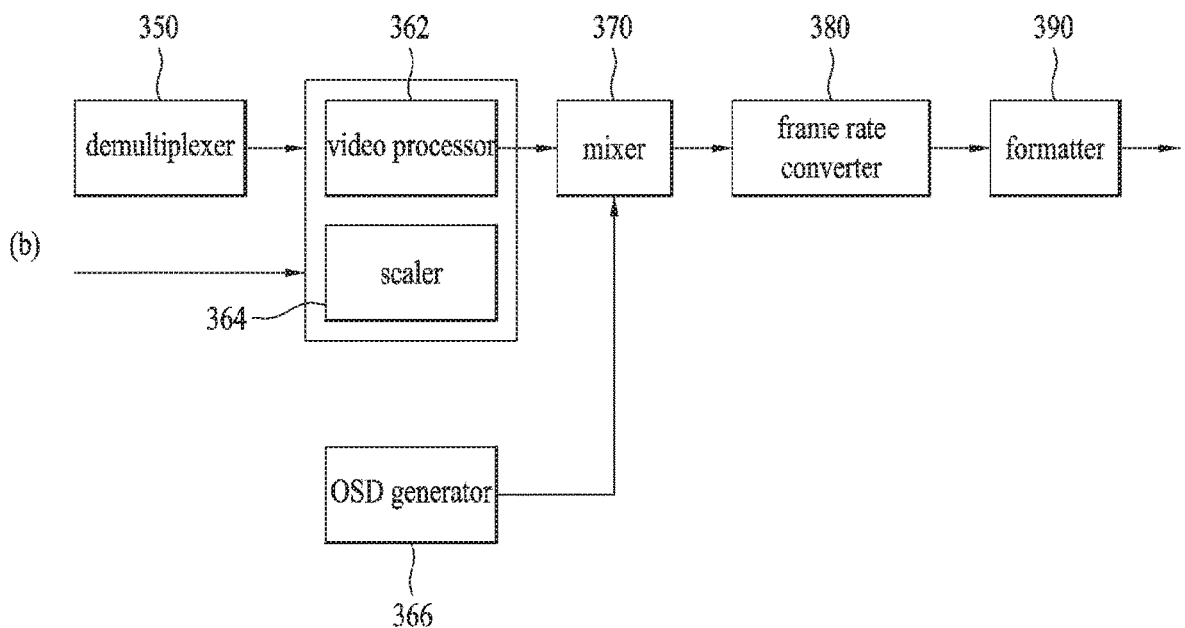

FIG. 11
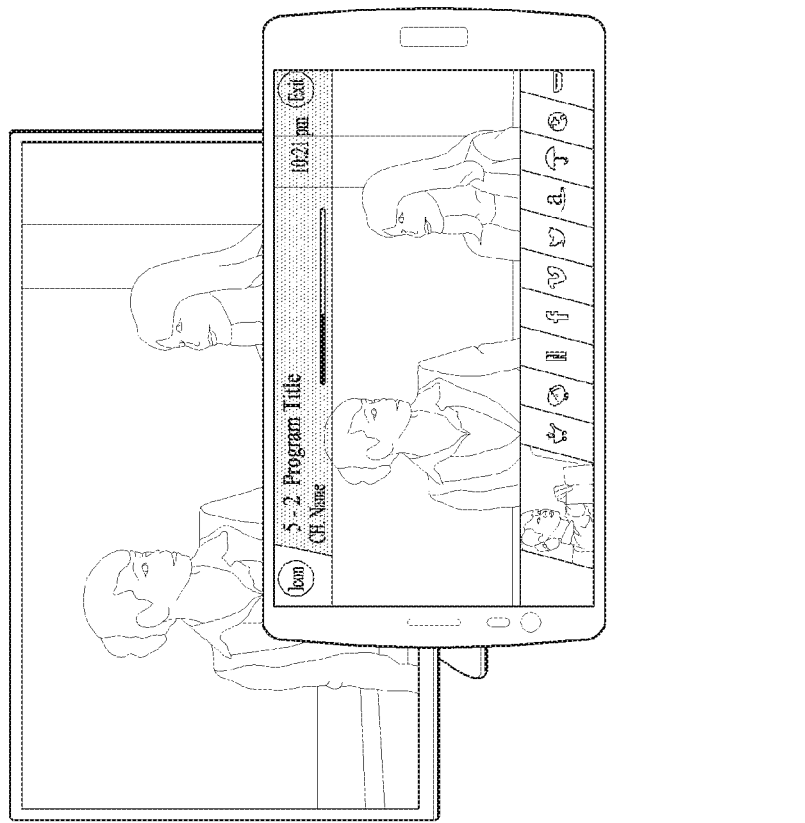
(b)
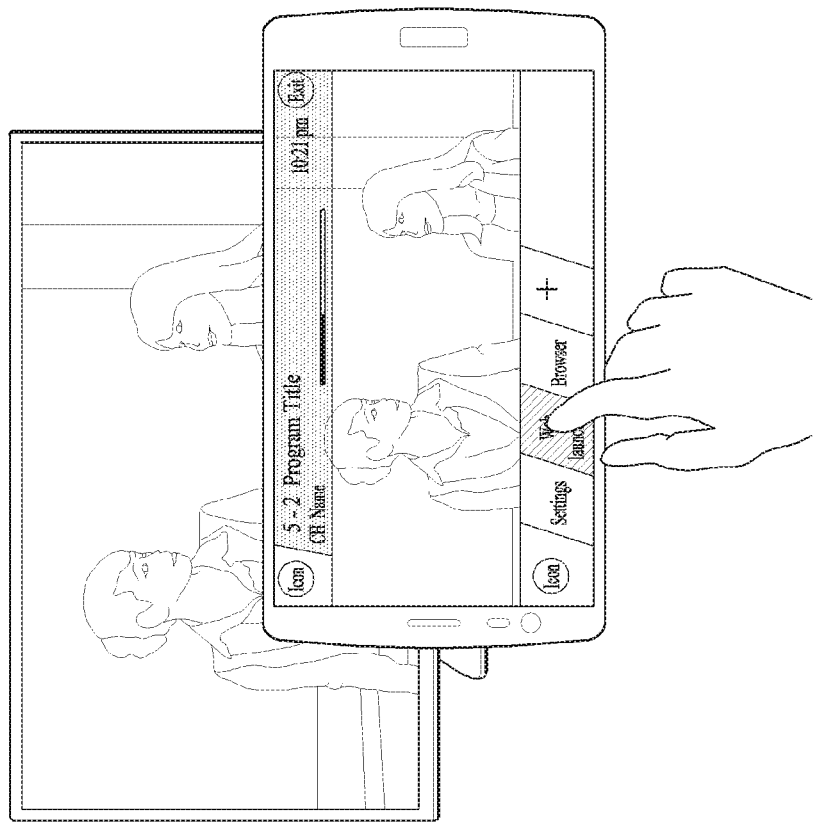
(a)

FIG. 16
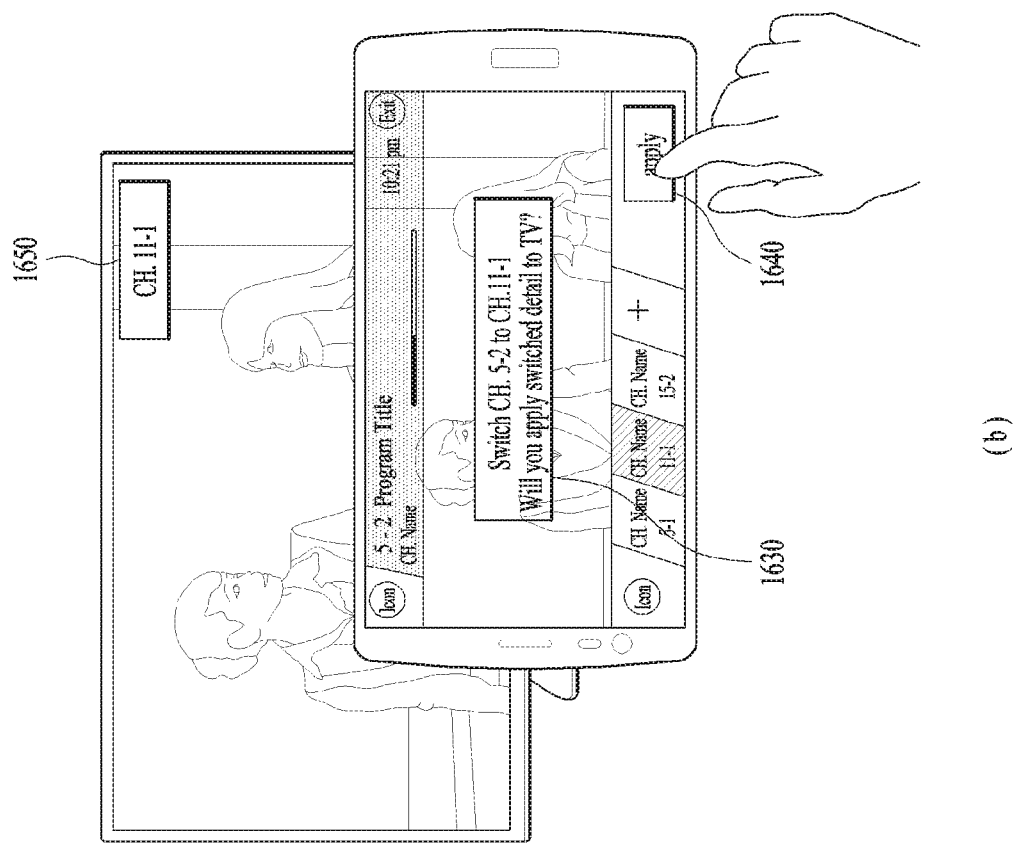
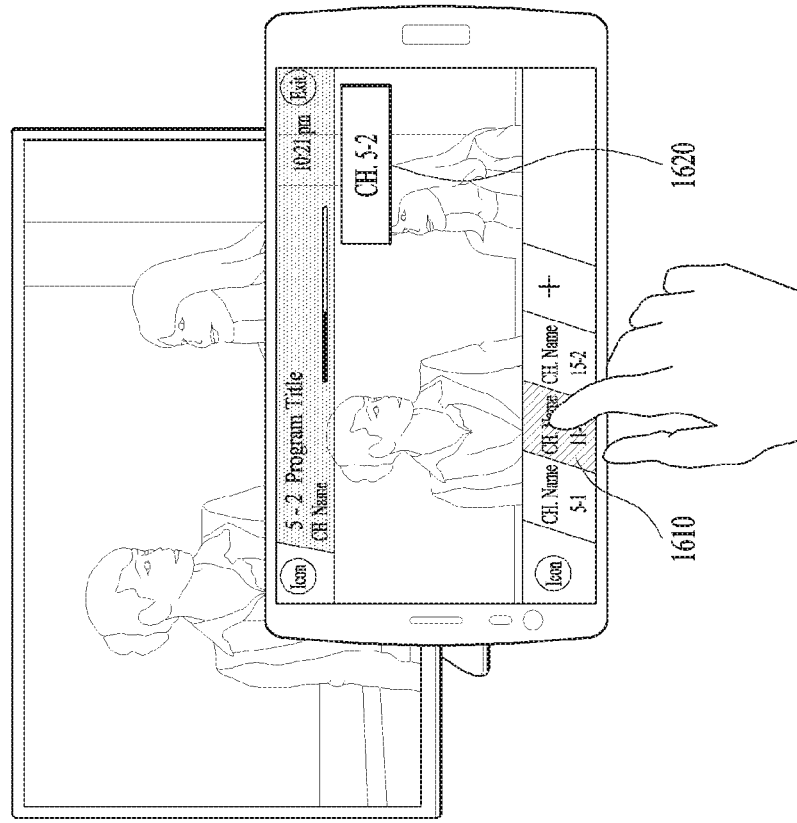

FIG. 19
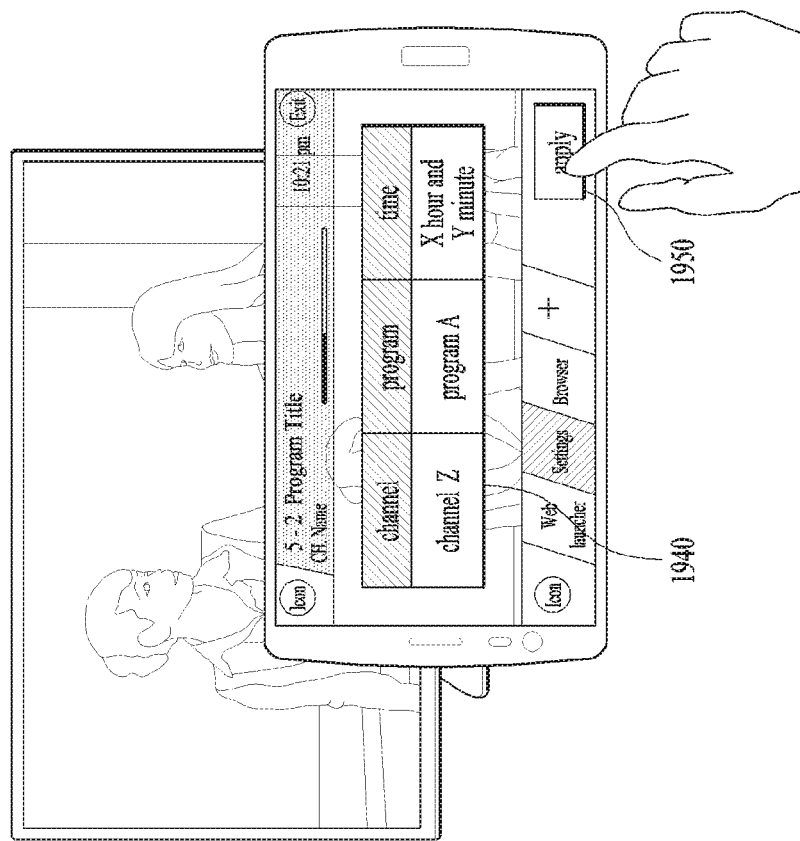
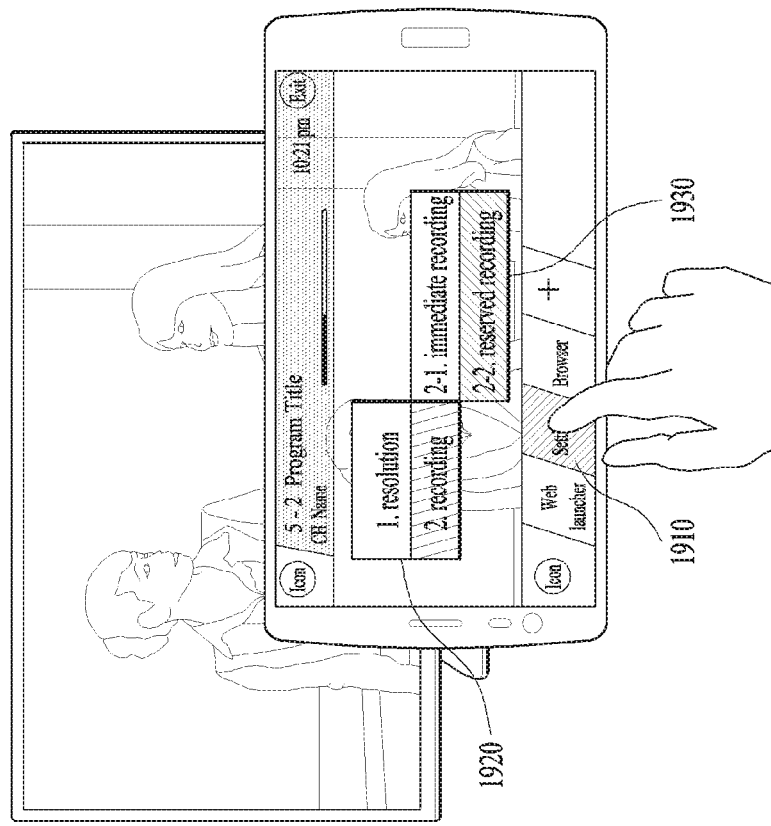

FIG. 20
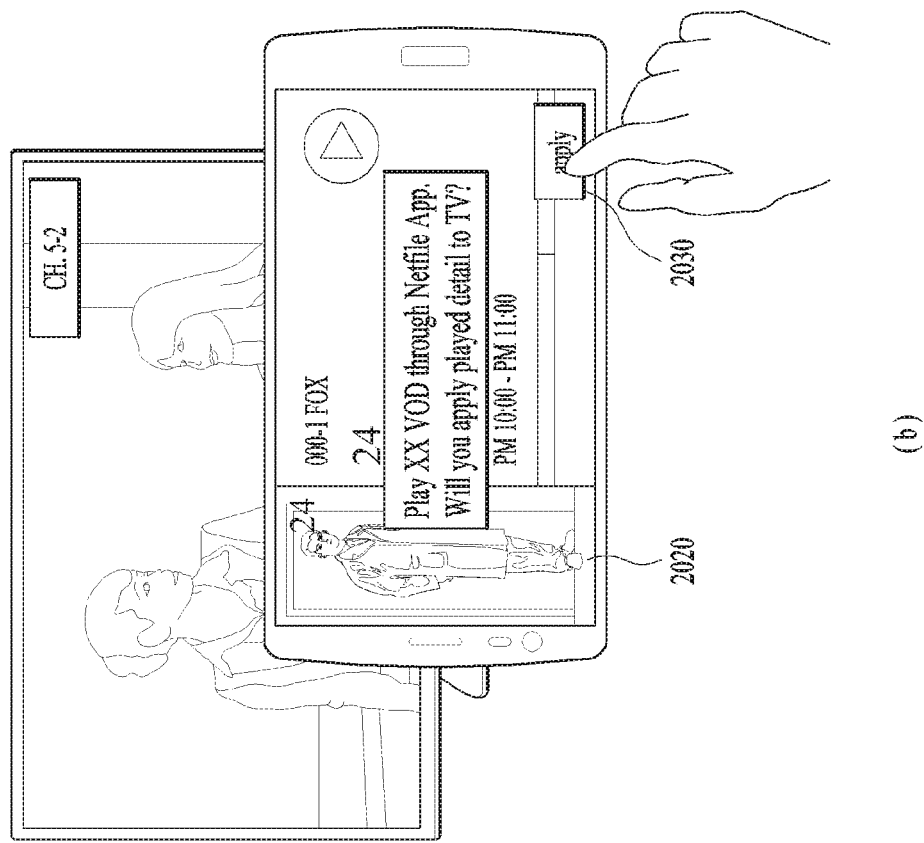
(b)
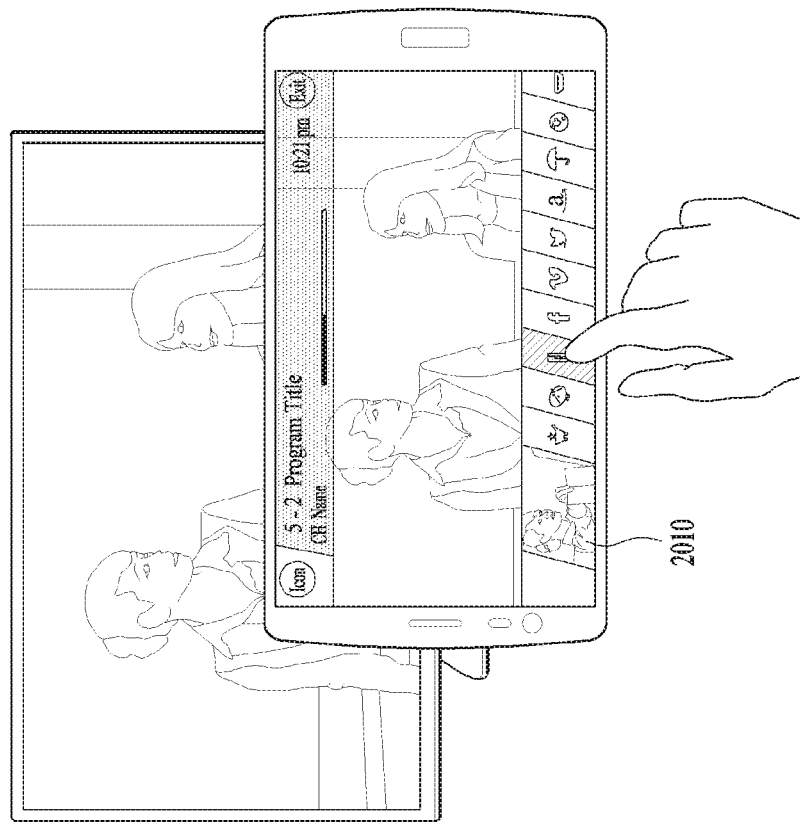
(a)

DIGITAL DEVICE TRANSMITTING MENU DATA TO AN EXTERNAL DEVICE, AND CONTROL METHOD THEREOF

CROSS-REFERENCE TO RELATED APPLICATIONS

This application is the National Stage filing under 35 U.S.C. 371 of International Application No. PCT/KR2016/009334, filed on Aug. 23, 2016, which claims the benefit of earlier filing date and right of priority to Korean Application No. 10-2015-0132423, filed on Sep. 18, 2015, the contents of which are all hereby incorporated by reference herein in their entirety.

TECHNICAL FIELD

The present invention relates to a digital device, and more particularly, to data processing if a keyboard input is required for the digital device.

BACKGROUND ART

Not only various standing devices such as a Personal Computer (PC) and a television (TV), but also various mobile devices such as a smartphone, a tablet PC and a wearable device have been remarkably developed. Although the standing devices and the mobile devices have been developed in different ways in their unique regions, their unique regions become ambiguous in accordance with the recent boom of digital convergence.

In accordance with remarkable increase of smart TVs or smartphones, various applications could be driven in the smart TV or smartphones. For example, a TV of the related art is simply based on volume or channel change through a remote controller but the various applications could be driven even in a TV in accordance with popularization of the smart TV. Meanwhile, the applications include an application having a function such as a remote controller of the smart TV. However, since this application is the same as a remote controller or includes key buttons simpler than the remote controller, there is a limitation in controlling the smart TV through a smartphone. For example, simple functions such as channel change and volume change of the smart TV are performed through the application, there is an inconvenience that a user should use the remote controller to perform a specific function.

DISCLOSURE

Technical Problem

The present specification discloses a digital device and a data processing method in the digital device to solve the inconvenience.

An object of the present invention is to control a digital TV through an application of a mobile terminal equally or similarly to control of the digital TV through a remote controller.

Another object of the present invention is to enhance convenience of digital TV control through a mobile terminal of a user by previously identifying a desired function, setup, etc. and applying the desired function, setup, etc. once as well as minimizing interruption of a user who currently watches contents while controlling the digital TV through an application of the mobile terminal not through a remote controller.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

The present specification discloses various embodiments of a digital device and a data processing method in the digital device.

A data processing method in a digital device according to one embodiment of the present invention comprises the steps of executing and displaying an application; receiving a menu request signal through a remote allocation executed in an external device; determining an attribute of the received menu request signal on the basis of the displayed application and generating menu data; transmitting the generated menu data to the external device and outputting the menu data through a screen of the external device; and performing transmission or operation of menu data corresponding to a menu item selection signal of a menu output from the external device if the menu item selection signal is received.

A digital device according to one embodiment of the present invention comprises a memory; a user interface unit for receiving a menu request signal through a remote application executed in an external device; a display unit for displaying an application by executing the application; and a controller for determining an attribute of the received menu request signal on the basis of the displayed application to generate menu data, transmitting the generated menu data to the external device and outputting the menu data through a screen of the external device, and when a menu item selection signal of the menu output from the external device is received, performing transmission or operation of menu data corresponding to the menu item selection signal.

It will be appreciated by persons skilled in the art that the technical solutions that could be achieved with the present invention are not limited to what has been particularly described hereinabove and the above and other technical solutions that the present invention could achieve will be more clearly understood from the following detailed description.

Advantageous Effects

Advantageous effects of the present invention are as follows.

According to one of various embodiments of the present invention, a digital TV may be controlled through an application of a mobile terminal equally or similarly to control of the digital TV through a remote controller.

According to another one of various embodiments of the present invention, convenience of digital TV control through a mobile terminal of a user may be enhanced by previously identifying a desired function, setup, etc. and applying the desired function, setup, etc. once as well as minimizing interruption of a user who currently watches contents while controlling the digital TV through an application of the mobile terminal not through a remote controller.

The effects that can be achieved through the present invention are not limited to what has been particularly described hereinabove and other effects not described herein will be more clearly understood by persons skilled in the art from the following detailed description.

BRIEF DESCRIPTION OF THE DRAWINGS

FIG. 3 is a block diagram for a different/detailed configuration shown in FIG. 2;

FIGS. 10 to 20 illustrate service scenarios that include a user interface for a data processing procedure related to at least one scheme of FIGS. 7 to 9, which is described in accordance with the embodiment of the present invention.

BEST MODE FOR CARRYING OUT THE INVENTION

Description will now be given in detail according to various embodiment(s) for a digital device and data processing method therein disclosed herein, with reference to the accompanying drawings.

Suffixes such as "module", "unit" and the like in this disclosure may be used to refer to elements or components. Use of such a suffix herein is merely intended to facilitate description of the specification, and both suffixes may be interchangeably usable. The description with ordinal numbers such as 'first ~', 'second ~' and the like is provided to facilitate the description of the corresponding terminologies only, which is non-limited by such terminologies or ordinal numbers. Although terminologies used in the present specification are selected from general terminologies used currently and widely in consideration of functions in the present invention, they may be changed in accordance with intentions of technicians engaged in the corresponding fields, customs, advents of new technologies and the like. Occasionally, some terminologies may be arbitrarily selected by the applicant(s). In this case, the meanings of the arbitrarily selected terminologies shall be described in the corresponding part of the detailed description of the invention. Therefore, terminologies used in the present specification need to be construed based on the substantial meanings of the corresponding terminologies and the overall matters disclosed in the present specification rather than construed as simple names of the terminologies. Meanwhile, the descriptions disclosed in the present specification and/or drawings correspond to one preferred embodiment of the present invention and are non-limited by the preferred embodiment.

And, the scope/extent of the right should be determined through the appended claims.

Figure 2:
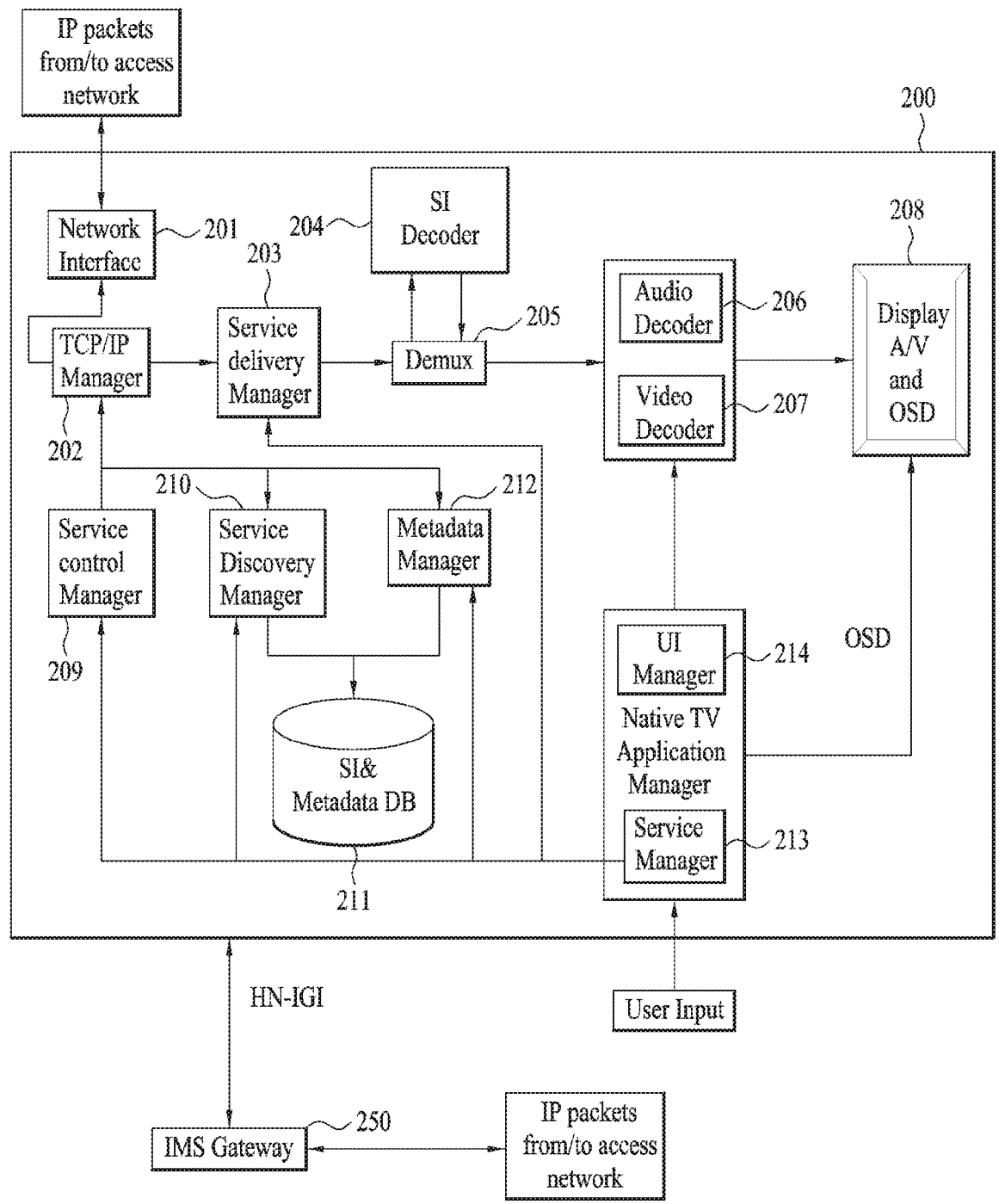
FIG. 2 is a block diagram of a digital device according to one embodiment of the present invention.
Figure 4:
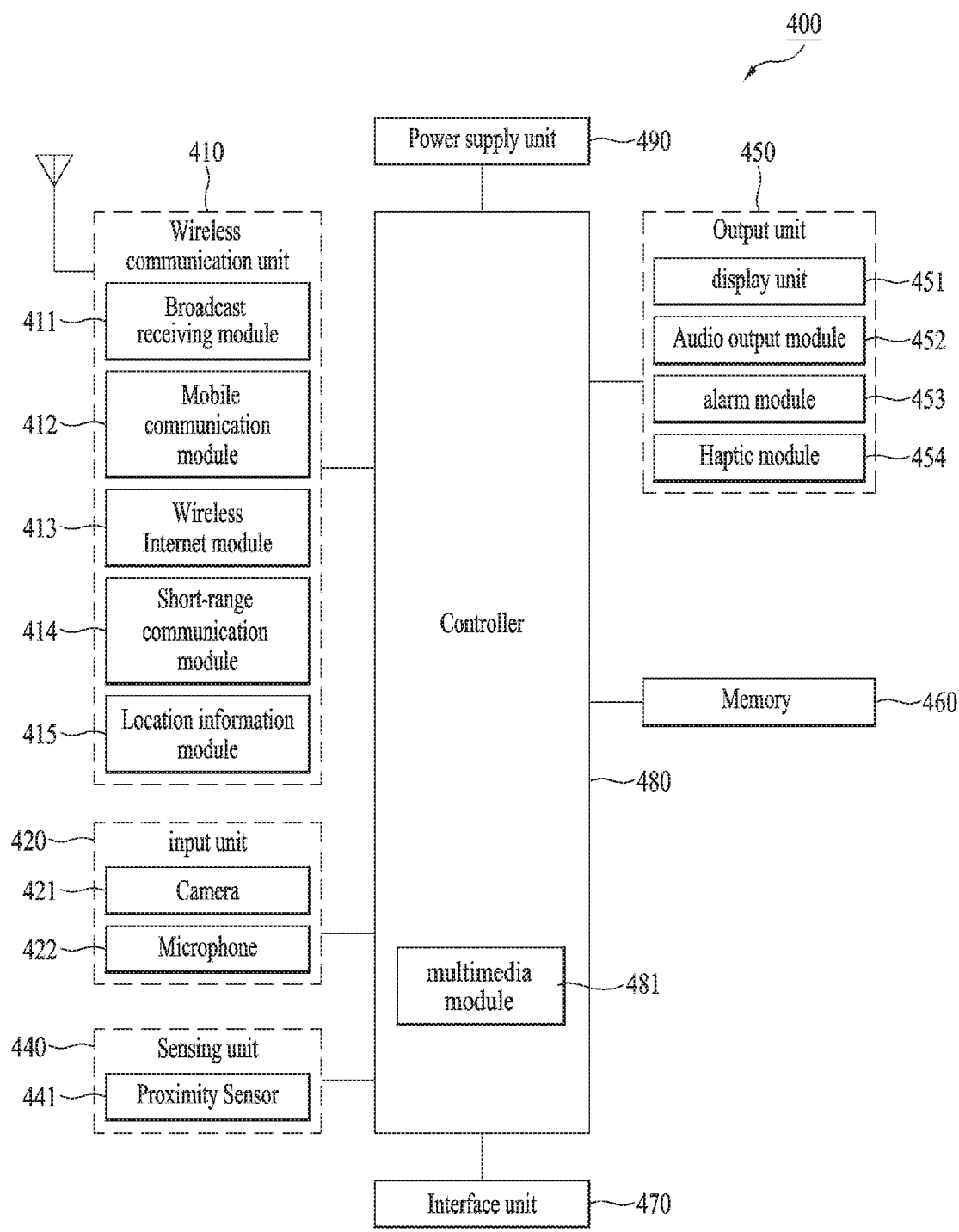
FIG. 4 is a block diagram of a peripheral device according to one embodiment of the present invention.
Figure 5:
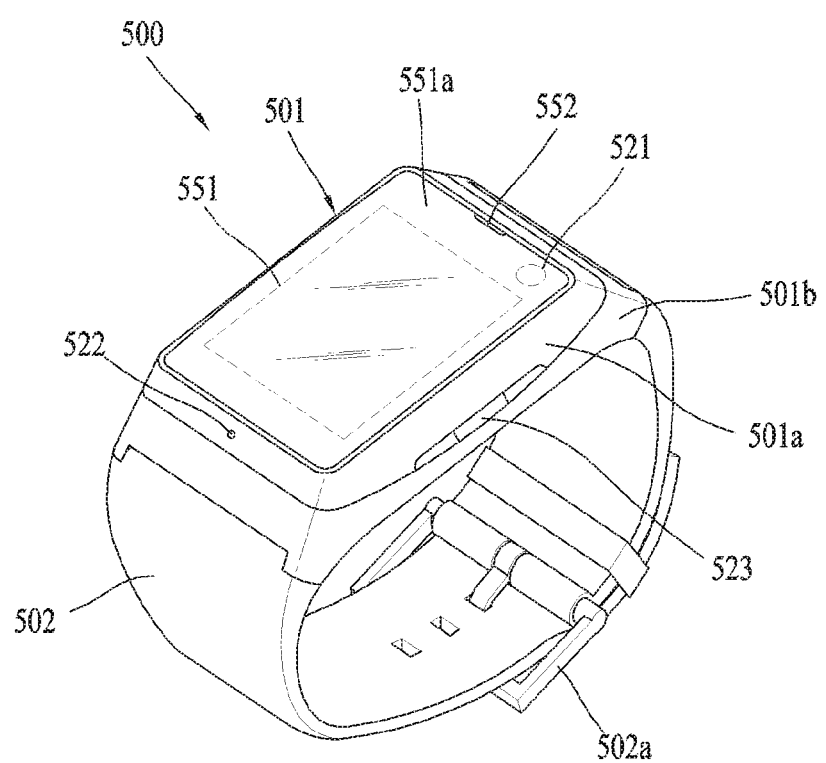
FIG. 5 is a diagram of a digital device or a peripheral device according to another embodiment of the present invention.

'Digital device' described in the present specification includes any device capable of performing at least one of transmission, reception, processing and output of contents for example. The digital device can receive the content or information on the content by streaming or download through a server (e.g., a broadcasting station), an external input or the like. The digital device may transmit/receive data including the content to/from the server or the like through a wire/wireless network. The digital device may include one of a fixed (or standing) device and a mobile device. The standing devices may include Network TV, HBBTV (Hybrid Broadcast Broadband TV), Smart TV, IPTV (Internet Protocol TV), PC (Personal Computer), etc. And, the mobile devices may include PDA (Personal Digital Assistant), Smart Phone, Tablet PC, Notebook, Digital Broadcast Terminal, PMP (portable multimedia player), Navigation, Slate PC, Ultrabook, Wearable Device (e.g., watch type terminal, glass type terminal, HMD (head mounted display), etc. In the following, for examples of digital devices, FIG. 2 and FIG. 3 show a digital TV as one of the standing devices and FIG. 4 and FIG. 5 show a mobile terminal and a wearable device (e.g., a smart watch) as the mobile devices, respectively. And, such digital devices shall be described in detail for the corresponding parts. If the digital device is the standing device, it may have include a signage having a display panel only or a SET type with another configuration such as a set-top box (STB) and the like.

In the above description, the wire/wireless network described in the present specification includes all hardware and/or software for a connection, pairing, data communication and the like between a server and a digital device, and also includes all networks supported currently or all networks that will be supported in the future, by Standards. The wire/wireless network is capable of supporting one or more communication protocols for data communications. Such wire/wireless networks can be established by a network for a wire connection and a communication specification or protocol for the same (e.g., USB (Universal Serial Bus), CVBS (Composite Video Banking Sync), Component, S-video (analog), DVI (Digital Visual Interface), HDMI (High Definition Multimedia Interface), RGB, D-SUB, etc.) and a network for a wireless connection and a communication specification or protocol (e.g., Bluetooth, RFID (Radio Frequency Identification), IrDA (infrared Data Association), UWB (Ultra Wideband), ZigBee, DLNA (Digital Living Network Alliance), WLAN (Wireless LAN)(Wi-Fi), Wibro (Wireless broadband), Wimax (World Interoperability for Microwave Access), HSDPA (High Speed Downlink Packet Access), LTE/LTE-A (Long Term Evolution/LTE-Advanced), Wi-Fi direct).

Besides, a digital device may use a universal OS (operating system), a Web OS and the like. Hence, the digital device can process adding, deleting, amending, updating and the like of various services or applications on Universal OS kernel or Linux kernel, through which a further user-friendly environment can be configured and provided.

A digital device according to one embodiment of the present invention includes a communication interface unit communicating with one or more peripheral devices, a display unit, and a controller configured to form a connectivity manager including information on one or more connectible peripheral devices and display the connectivity manager on a screen, the controller configured to if the information on at least one peripheral device on the displayed connectivity manager is selected, connect to a first peripheral device by sending a first control signal, the controller configured to receive first data from the connected first peripheral device and display the received first data on the screen, wherein if the connectivity manager is called and information on a second peripheral device is selected, the controller is further configured to connect to the second peripheral device by sending a second control signal and transmit the first data to the connected second peripheral device.

Figure 1:
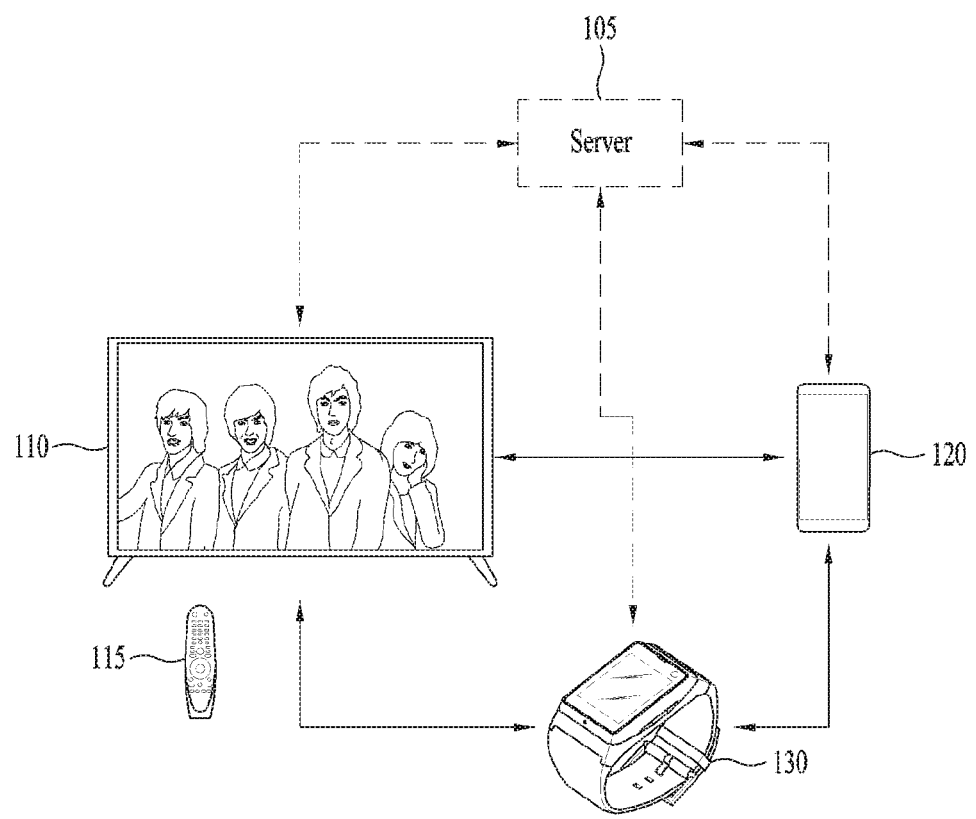
FIG. 1 is a schematic diagram of a service system according to one embodiment of the present invention.

FIG. 1 is a schematic diagram illustrating a service system according to one embodiment of the present invention.

Referring to FIG. 1, a service system may be implemented by including a plurality of digital devices 110, 120 and 130 capable of performing data communications by communicating with each other. Herein, for the communications or data communications among a plurality of the digital devices 110, 120 and 130 or for at least one of a plurality of the digital devices 110, 120 and 130, a server 105 may be further included in the service system. Meanwhile, in some cases, the server 105 may include one of various processors or devices such as a gateway, a relay, a gap filler, a communication relay and the like and perform functions with them.

Meanwhile, although the digital TV 110, the smartphone 120 and the smartwatch 130 are illustrated as the digital devices, various devices such as a camera, a keyboard, a headset, a sound bar, a speaker, a printer (e.g., pocket photo), a vehicle, an air conditioner, a refrigerator, an electric cooker, an electric cleaner (or robot cleaner) and the like can be included in the digital devise in association with the present invention. Meanwhile, at least one digital device (named 'main device' hereinafter) among a plurality of the digital devices can control the rest of the digital device(s) (named 'peripheral device(s)'). Data communications between the main device and the peripheral device(s), particular control processes and the like shall be described in detail later.

With reference to FIGS. 2 to 5, configuration block diagrams of the digital devices shown in FIG. 1 are described for example. FIGS. 2 to 5 in the following may include configuration block diagrams of the aforementioned main or peripheral devices. Meanwhile, in the present invention, a main/peripheral device may include a single device or a plurality of devices. So to speak, it is able to control at least one peripheral device using at least one main device.

FIG. 2 is a block diagram showing a digital TV according to one embodiment of the present invention.

In the following, referring to FIG. 2, the digital TV 200 may include a network interface 201, a TCP/IP manager 202, a service delivery manager 203, an SI decoder 204, a demuxer or demultiplexer 205, an audio decoder 206, a video decoder 207, a display A/V and OSD (On Screen Display) module 208, a service control manager 209, a service discovery manager 210, a SI & metadata database (DB) 211, a metadata manager 212, a service manager 213, a UI manager 214, etc.

The network interface 201 may transmit/receive IP (internet protocol) packet(s) or IP datagram(s) (hereinafter named IP pack(s)) to/from the server 105 through a network. For instance, the network interface 201 may receive services, applications, contents, broadcast programs and the like from the server 105 shown in FIG. 1 via such a medium as terrestrial, cable, satellite, IP and the like through a network.

The TCP/IP manager 202 may involve delivery of IP packets transmitted to the digital TV 200 and IP packets transmitted from the digital TV 200, that is, packet delivery between a source and a destination. The TCP/IP manager 202 may classify received packet(s) according to an appropriate protocol and output the classified packet(s) to the service delivery manager 205, the service discovery manager 210, the service control manager 209, the metadata manager 212, and the like.

The service delivery manager 203 may be in charge of controlling the received service data. The service delivery manager 203 may control real-time streaming data, for example, using RTP/RTCP. In case of transmitting the real-time streaming data using RTP, the service delivery manager 203 may parse the received data packet according to the RTP and then transmits the parsed data packet to the demultiplexer 205 or save the parsed data packet to the SI & metadata DB 211 under the control of the service manager 213. The service delivery manager 203 may feed back the network reception information to the service providing server side using RTCP.

The demultiplexer 205 may demultiplex a received packet into audio data, video data, SI (System Information/Service Information/Signaling Information) data and the like and then transmit the demultiplexed data to the audio/video decoder 206/207 and the SI decoder 204, respectively.

The SI decoder 204 may decode the demultiplexed SI data, i.e., service informations of PSI (Program Specific Information), PSIP (Program and System Information Protocol), DVB-SI (Digital Video Broadcasting-Service Information), DTMB/CMMB (Digital Television Terrestrial Multimedia Broadcasting/Coding Mobile Multimedia Broadcasting), etc. And, the SI decoder 204 may save the decoded service informations to the SI & metadata DB 211. The saved service information can be used by being read by a corresponding component in response to a user's request for example.

The audio decoder 206 and the video decoder 207 may decode the demultiplexed audio data and the demultiplexed video data, respectively. The decoded audio and video data may be provided to the user through the display unit 208.

The application manager includes a service manager 213 and a user interface (UI) manager 214 and is able to perform a function of a controller of the digital TV 200. So to speak, the application manager can administrate the overall states of the digital TV 200, provide a user interface (UI), and manage other mangers.

The UI manager 214 provides a graphical user interface/user interface (GUI/UI) using OSD (on screen display) and the like. The UI manager 214 receives a key input from a user and then performs a device operation according to the input. For instance, if receiving a key input about a channel selection from a user, the UI manager 214 transmits the key input signal to the service manager 213.

The service manager 213 may control and manage service-related managers such as the service delivery manager 203, the service discovery manager 210, the service control manager 209, and the metadata manager 212. The service manager 213 creates a channel map and controls a selection of a channel and the like using the created channel map in response to a key input received from the UI manager 214. The service manager 213 may receive service information from the SI decoder 204 and then sets an audio/video PID of a selected channel for the demultiplexer 205. Such a PID can be used for the demultiplexing procedure. Therefore, the demultiplexer 205 performs filtering (PID or section filtering) on audio data, video data and SI data using the PID.

The service discovery manager 210 may provide information required to select a service provider that provides a service. Upon receipt of a signal for selecting a channel from the service manager 213, the service discovery manager 210 searches for a service using the information.

The service control manager 209 may select and control a service. For example, the service control manager 209 may perform service selection and control using IGMP (Internet Group Management Protocol) or real time streaming protocol (RTSP) when the user selects a live broadcast service and using RTSP when the user selects a video on demand (VOD) service. The RTSP protocol can provide a trick mode for real-time streaming. And, the service control manager 209 may initialize and manage a session through the IMS gateway 250 using IMS (IP multimedia subsystem) and SIP (session initiation protocol). The protocols are exemplary, and other protocols are usable according to implementations.

The metadata manager 212 may manage metadata associated with services and save the metadata to the SI & metadata DB 211.

The SI & metadata DB 211 may store service information decoded by the SI decoder 204, metadata managed by the metadata manager 212, and information required to select a service provider, which is provided by the service discovery manager 210. In addition, the SI & metadata DB 211 can store system set-up data and the like for the system. The SI & metadata database 211 may be implemented with non-volatile RAM (NVRAM), flash memory and the like.

Meanwhile, an IMS gateway 250 is a gateway in which functions required for an access to an IMS based IPTV service are collected.

In FIG. 2, the network interface 201, at least one configuration of the application manager, a user interface 320 to be described in FIG. 3, one configuration of a wireless communication unit 410 or an interface 470 to be mentioned in FIG. 4, one configuration mentioned in FIG. 5 and the like may provide interfaces for communications or data communications with a user, other digital devices and the like and exchange data including control data with each other.

FIG. 3 is a block diagram showing another configuration or detailed configuration of FIG. 2.

Referring to FIG. 3(a), a digital TV may include a broadcast receiving unit 305, an external device interface 316, a storage unit 318, a user interface 320, a controller 325, a display unit 330, an audio output unit 335, a power supply unit 340, and a photographing unit (not shown). Herein, the broadcast receiving unit 305 may include at least one of one tuner 310, a demodulator 312, and a network interface 314. Yet, in some cases, the broadcast receiving unit 305 may include the tuner 310 and the demodulator 312 without the network interface 314, or may include the network interface 314 without the tuner 310 and the demodulator 312. The broadcast receiving unit 305 may include a multiplexer (not shown) to multiplex a signal, which is subjected to the tuner 310 and demodulated by the demodulator 312, and a signal received through the network interface 314. In addition, the broadcast receiving unit 305 can include a demultiplexer (not shown) and demultiplex the multiplexed signal, the demodulated signal, or a signal received through the network interface 314.

The tuner 310 may receive a radio frequency (RF) broadcast signal by tuning in to a channel selected by the user or all previously stored channels among RF broadcast signals received through an antenna. And, the tuner 310 converts the received RF broadcast signal into an IF (intermediate frequency) signal or a baseband signal. For instance, if a received RF broadcast signal is a digital broadcast signal, it is converted into a digital IF (DIF) signal. If a received RF broadcast signal is an analog signal, it is converted into an analog baseband video/audio signal (CVBS/SIF). Namely, the tuner 310 is able to process both of the digital broadcast signal and the analog signal. The analog baseband video/audio signal (CVBS/SIF) outputted from the tuner 310 may be directly inputted to the controller 325. The tuner 310 may receive an RF broadcast signal of a single carrier or multiple carriers. The tuner 310 sequentially tunes in to and receives RF broadcast signals of all broadcast channels stored through the channel memory function among RF broadcast signals received through the antenna and is then able to convert it into an intermedia frequency signal or a baseband signal (DIF: digital intermediate frequency or baseband signal).

The demodulator 312 receives and demodulates the digital IF signal (DIF) converted by the tuner 310 and is then able to channel decoding and the like. To this end, the demodulator 312 may include a Trellis decoder, a de-interleaver, a Reed-Solomon decoder and the like, or may include a convolution decoder, a de-interleaver, a Reed-Solomon decoder and the like. The demodulator 312 performs demodulation and channel decoding and is then able to output a stream signal TS (transport stream). In this case, the stream signal may include a signal of multiplexing a video signal, an audio signal and/or a data signal. For instance, the stream signal may include MPEG-2 TS (transport stream) in which a video signal of PMEG-2 and an audio signal of Dolby AC-3 are multiplexed. The stream signal outputted from the demodulator 312 may be inputted to the controller 325. The controller 325 can control demultiplexing, audio/video signal processing, etc. Furthermore, the controller 325 can control outputs of video and audio through the display 330 and the audio output unit 335, respectively.

The external device interface 316 may provide an interfacing environment between the digital device 300 and various external devices. To this end, the external device interface 316 may include an A/V input/output unit (not shown) or a wireless communication unit (not shown). The external device interface 316 can be connected with external devices such as a digital versatile disk (DVD), a Blu-ray player, a game device, a camera, a camcorder, a computer (notebook computer), a tablet PC, a smartphone, a cloud and the like by wire/wireless. The external device interface 316 delivers a signal containing data such as an image, a video, an audio and the like, which is inputted through the connected external device, to the controller 325 of the digital TV. The controller 325 may control a data signal of the processed image, video and audio and the like to be outputted to the connected external device. To this end, the external device interface 316 may further include an A/V input/output unit (not shown) or a wireless communication unit (not shown).

In order to input video and audio signals of an external device to the digital TV, the A/V input/output unit may include a USB (Universal Serial Bus) terminal, a composite video banking sync (CVBS) terminal, a component terminal, an S-video terminal (analog), a digital visual interface (DVI) terminal, a high definition multimedia interface (HDMI) terminal, an RGB terminal, a D-SUB terminal, etc.

The wireless communication unit can perform short-range wireless communication with another digital device. The digital TV may be networked with other digital devices by communication protocols such as Bluetooth, radio frequency identification (RFID), infrared data association (IrDA), ultra wideband (UWB), ZigBee, and digital living network alliance (DLNA), etc. for example.

Moreover, the external device interface 316 may perform input/output operations with a set-top box (STB) by being connected thereto through at least one of the aforementioned terminals. Meanwhile, the external device interface 316 may receive an application or an application list within an adjacent external device and then forward it to the controller 325 or the storage unit 318.

The network interface 314 may provide an interface for connecting the digital TV to wired/wireless networks including Internet network. The network interface 314 may have Ethernet terminal and the like for an access to a wired network for example. For the access to the wireless network, the network interface 314 may use communication specifications such as WLAN (Wireless LAN) (Wi-Fi), Wibro (Wireless broadband), Wimax (World Interoperability for Microwave Access), HSDPA (High Speed Downlink Packet Access), etc. The network interface 314 may transceive data with another user or another digital device through the accessed network or another network linked to the accessed network. Particularly, the network interface 314 may send a portion of the content data stored in the digital TV to a user/digital device selected from other users/digital devices previously registered at the digital TV. Meanwhile, the network interface 314 may access a prescribed webpage through the accessed network or another network linked to the accessed network. Namely, the network interface 314 accesses a prescribed webpage through a network and is then able to transceive data with a corresponding server. Besides, the network interface 314 can receive contents or data provided by a content provider or a network operator. Namely, the network interface 314 may receive contents (e.g., movie, advertisement, game, VOD, broadcast signal, etc.) provided by the content provider or a network provider and information associated with the contents through the network. The network interface 314 may receive update information and file of firmware provided by the network operator.

And, the network interface 314 may send data to the internet or content provider or the network operator. Moreover, the network interface 314 may select a desired application from open applications and receive it through a network.

The storage unit 318 may store programs for various signal processing and controls within the controller 325, and may also store a processed video, audio or data signal. In addition, the storage unit 318 may execute a function of temporarily storing a video, audio or data signal inputted from the external device interface 316 or the network interface 314. The storage unit 318 may store information on a prescribed broadcast channel through a channel memory function. The storage unit 318 may store an application or an application list inputted from the external device interface 316 or the network interface 314. And, the storage unit 318 may store various platforms which will be described later. The storage unit 318 may include storage media of one or more types, such as a flash memory type, a hard disk type, a multimedia card micro type, a card type memory (e.g. SD or XD memory), RAM, EEPROM, etc. The digital TV may play content files (a video file, a still image file, a music file, a text file, an application file, etc.) stored in the storage unit 318 and provide them to the user. FIG. 3(*a*) illustrates an embodiment in which the storage unit 318 is separated from the controller 325, by which the present invention is non-limited. In other words, the storage unit 318 may be included in the controller 325.

The user interface 320 may forward a signal inputted by a user to the controller 325 or forward a signal outputted from the controller 325 to the user. For example, the user input interface 320 may receive control signals for power on/off, channel selection, screen settings and the like from a remote control device 345, or transmit control signals of the controller 325 to the remote control device 345, according to various communication schemes such as RF communication, IR communication, and the like. The user interface 320 can forward control signals inputted through a power key, a channel key, a volume key, and a local key (not shown) for a setup value or the like to the controller 325. The user interface 320 may forward a control signal inputted from a sensing unit (not shown) sensing a gesture of a user to the controller 325 or transmit a signal of the controller 325 to the sensing unit (not shown). Here, the sensing unit (not shown) may include a touch sensor, a voice sensor, a location sensor, an action sensor, etc.

The controller 325 may generate and output a signal for a video or audio output by demultiplexing a stream inputted through the tuner 310, the demodulator 312 or the external device interface 316 or processing demultiplexed signals. A video signal processed by the controller 325 can be inputted to the display unit 380 and displayed as an image corresponding to the video signal. In addition, the video signal video-processed by the controller 325 can be inputted to an external output device through the external device interface 316. An audio signal processed by the controller 325 can be audio-outputted to the audio output unit 335. Moreover, the audio signal processed by the controller 325 can be inputted to the external output device through the external device interface 316. The controller 325 may include a demultiplexer, an image processor, and the like, which are not shown in FIG. 3(*a*). The controller 325 can control the overall operations of the digital TV. For example, the controller 325 can control the tuner 310 to tune in to an RF broadcast corresponding to a channel selected by a user or a previously stored channel. The controller 325 can control the digital TV according to a user command input through the user input interface 320 or an internal program. Particularly, the controller 325 can control the digital TV to access a network to download an application or an application list desired by a user to the digital TV. For example, the controller 325 may control the tuner 310 to receive a signal of a channel selected in response to a prescribed channel selection command received through the user input interface 320. And, the controller 325 may process a video, audio or data signal of the selected channel. The controller 325 may control information on a channel selected by the user to be outputted together with a processed video or audio signal through the display unit 330 or the audio output unit 335. For another example, the controller 325 may control a video signal or an audio signal, which is inputted through the external device interface unit 316 from an external device (e.g., a camera or a camcorder), to be outputted through the display unit 330 or the audio output unit 335 in response to an external device image play command received through the user input interface 320. Meanwhile, the controller 325 can control the display unit 330 to display a video. For example, the controller 325 can control a broadcast video inputted through the tuner 310, an external input video inputted through the external device interface 316, a video inputted through the network interface 430, or a video stored in the storage unit 440 to be displayed on the display unit 330. Here, the video displayed on the display unit 330 may include a still image or moving images or may include a 2D or 3D video. The controller 325 may control a content to be played. Here, the content may include a content stored in the digital TV, a received broadcast content, or a content inputted externally. The content may include at least one of a broadcast video, an external input video, an audio file, a still image, an accessed web screen, and a document file. The controller 325 may control an application or an application list, which is located in the digital device 300 or downloadable from an external network, to be displayed when an application view menu is entered. The controller 325 may control installation and execution of applications downloaded from an external network together with various user interfaces. Moreover, the controller 325 can control a video related to a launched application to be displayed on the display unit 330 by a user's selection.

Meanwhile, a channel browsing processor (not shown) configured to generate a thumbnail image corresponding to a channel signal or an external input signal may be further included. The channel browsing processor may receive an input of a stream signal (TS) outputted from the demodulator 312 or an input of a stream signal outputted from the external device interface 316, extract a video from the inputted stream signal, and then generate a thumbnail image. The generated thumbnail image can be directly inputted to the controller 325 or may be inputted to the controller 325 by being encoded. Moreover, the generated thumbnail image may be encoded into a stream and then inputted to the controller 325. The controller 325 may display a thumbnail list including a plurality of thumbnail images on the display unit 330 using the inputted thumbnail images. The thumbnail images included in the thumbnail list can be updated sequentially or simultaneously. Accordingly, the user can conveniently check content of a plurality of broadcast channels.

The display unit 330 may convert each of a video signal, a data signal, and an OSD signal processed by the controller 325 or each of a video signal and a data signal received from the external device interface 316 into R, G and B signals to generate a drive signals. The display unit 330 may include PDP (Plasma Display Panel), LCD (Liquid Crystal Display), OLED (Organic Light Emitting Diode), a flexible display, a 3D display, or the like. The display unit 330 may be configured as a touchscreen and used as an input device as well as an output device. The audio output unit 335 receives a signal audio-processed by the controller 325, for example, a stereo signal, a 3.1 channel signal or a 5.1 channel signal, and then outputs the received signal as audio. The audio output unit 335 may be configured as one of speakers of various types.

Meanwhile, the digital TV may further include the sensing unit (not shown) for sensing a gesture of the user, which includes at least one of a touch sensor, a voice sensor, a location sensor, and an action sensor, as described above. A signal sensed by the sensing unit (not shown) can be delivered to the controller 325 through the user input interface 320. The digital TV may further include a photographing unit (not shown) for photographing a user. Image information acquired by the photographing unit (not shown) can be inputted to the controller 325. The controller 325 may sense a gesture of a user from an image captured by the photographing unit (not shown) or a signal sensed by the sensing unit (not shown), or by combining the image and the signal.

The power supply unit 340 may supply a corresponding power to the digital TV overall. Particularly, the power supply unit 340 can supply the power to the controller 325 configurable as a system-on-chip (SoC), the display unit 330 for a video display, and the audio output unit 335 for an audio output. To this end, the power supply unit 340 may include a converter (not shown) configured to convert an AC power to a DC power. Meanwhile, for example, if the display unit 330 is configured as an LCD panel having a multitude of backlight lamps, the power supply unit 340 may further include an inverter (not shown) capable of PWM (pulse width modulation) operation for luminance variation or dimming drive.

The remote control device 345 sends a user input to the user input interface 320. To this end, the remote control device 345 can use Bluetooth, RF communication, IR communication, UWB, ZigBee, etc. In addition, the remote control device 345 can receive audio, video or data signal outputted from the user input interface 320 and then display the received signal or output the same as audio or vibration.

Regarding the digital device according to the present invention, some of the illustrated components may be omitted or new components (not shown) may be further added as required. On the other hand, the digital device may not include the tuner and the demodulator, differently from the aforementioned digital device, and may play a content by receiving the content through the network interface or the external device interface.

Referring to FIG. 3(b), one example of the controller may include a demultiplexer 350, a video processor, an OSD generator 366, a mixer 370, a frame rate converter (FRC) 380, and a formatter 390. Besides, the controller may further include an audio processor and a data processor (not shown).

The demultiplexer 350 demultiplexes an inputted stream. For instance, the demultiplexer 350 can demultiplex an inputted stream signal into an MPEG-2 TS video, audio and data signals. Herein, the stream signal inputted to the demultiplexer may include a stream signal outputted from the tuner, demodulator or external device interface.

The video processor performs a video processing of the demultiplexed video signal. To this end, the video processor may include a video decoder 362 and a scaler 364. The video decoder 362 can decode the demultiplexed video signal, and the scaler 364 can scale the resolution of the decoded video signal to be outputtable from the display. The video decoder 362 can support various specifications. For instance, the video decoder 362 performs a function of MPEG-2 decoder if a video signal is encoded by MPEG-2. And, the video decoder 364 performs a function of H.264 decoder if a video signal is encoded by DMB (digital multimedia broadcasting) or H.264. Meanwhile, the video signal decoded by the image processor is inputted to the mixer 370.

The OSD generator 366 may generate OSD data according to a user input or by itself. For example, the OSD generator 366 may generate data to be displayed on the screen of the display 380 in the graphic or text form on the basis of a control signal of a user input interface. The generated OSD data may include various data such as a user interface screen of the digital device, various menu screens, widgets, icons, viewing rate information and the like. The OSD generator 366 can generate data to display a caption of a broadcast video or EPG based broadcast information.

The mixer 370 mixes the OSD data generated by the OSD generator 366 and the video signal processed by the video processor. The mixer 370 then provides the mixed signal to the formatter 390. By mixing the decoded video signal and the OSD data, OSD is displayed in a manner of overlaying a broadcast video or an external input video.

The frame rate converter (FRC) 380 may convert a frame rate of an inputted video. For example, the frame rate converter 380 can convert the frame rate of an inputted 60 Hz video into a frame rate of 120 Hz or 240 Hz according to an output frequency of the display unit. As described above, there may exist various methods of converting a frame rate. For instance, in case of converting a frame rate into 120 HZ from 60 Hz, the frame rate converter 380 can perform the conversion by inserting a first frame between the first frame and a second frame or inserting a third frame predicted from the first and second frames. For another instance, in case of converting a frame rate into 240 Hz from 60 Hz, the frame rate converter 380 can perform the conversion by further inserting three same or predicted frames between the existing frames. Meanwhile, in case of not performing a separate frame conversion, the frame rate converter 380 may be bypassed.

The formatter 390 may change the output of the frame rate converter 380, which is inputted thereto, to fit an output format of the display unit. For example, the formatter 390 can output an RGB data signal. In this case, this RGB data signal can be outputted as low voltage differential signal (LVDS) or mini-LVDS. If an inputted output of the frame rate converter 380 is a 3D video signal, the formatter 390 outputs the signal by configuring a 3D format to fit the output format of the display unit, whereby a 3D service can be supported through the display unit.

Meanwhile, an audio processor (not shown) in the controller can perform audio processing of a demultiplexed audio signal. Such an audio processor (not shown) can provide supports to process various audio formats. For instance, if an audio signal is encoded in format of MPEG-2, MPEG-4, AAC, HE-AAC, AC-3, BSAC, or the like, a corresponding decoder is further included to process the audio signal. And, the audio processor (not shown) in the controller can process base, treble, volume adjustment and the like. A data processor (not shown) in the controller can process a demultiplexed data signal. For example, when a demultiplexed data signal is encoded, the data processor can decode the encoded demultiplexed data signal. Here, the encoded data signal may be EPG information including broadcast information such as start and end times of a broadcast program broadcasted on each channel, and the like.

Meanwhile, the above-described digital TV is one example according to the present invention. And, at least one of the components may be integrated, added or omitted depending on options of an actually embodied digital TV. In particular, if necessary, at least two or more components can be integrated into a single component or a prescribed component can be divided into at least two or more components. Moreover, a function performed by each block is provided to describe one embodiment of the present invention. A detailed operation or device for the function may non-limit the scope of the appended claims and their equivalents of the present invention. Meanwhile, a digital TV may include an image signal processing device configured to process a signal of an image saved in the corresponding device or a signal of an inputted image. Examples of the image signal processing device may include a settop box (STB) failing to include the display unit 330 and the audio output unit 335 shown in FIG. 3(*a*), the aforementioned DVD player, a Blu-ray player, a game device, a computer and the like.

FIG. 4 is a block diagram showing a mobile terminal according to one embodiment of the present invention.

In FIG. 4, illustrated is a configuration block diagram of a mobile terminal 120 as another embodiment of the digital device shown in FIG. 1.

Referring to FIG. 4, the mobile terminal 400 includes a wireless communication unit 410, an A/V (audio/video) input unit 420, a user input unit 430, a sensing unit 440, an output unit 450, a memory 460, an interface unit 470, a controller 480, a power supply unit 490, etc.

The wireless communication unit 410 typically includes one or more modules which permit wireless communication between the mobile terminal 400 and a wireless communication system or network within which the mobile terminal 400 is located. For instance, the wireless communication unit 410 can include a broadcast receiving module 411, a mobile communication module 412, a wireless Internet module 413, a short-range communication module 414, a location information module 415, etc.

The broadcast receiving module 411 receives a broadcast signal and/or broadcast associated information from an external broadcast managing server via a broadcast channel. The broadcast channel may include a satellite channel and a terrestrial channel. The broadcast managing server may mean a server generating to send a broadcast signal and/or broadcast associated information or a server receiving to send a pre-generated broadcast signal and/or broadcast associated information to a terminal. The broadcast signal may be implemented as a TV broadcast signal, a radio broadcast signal, and/or a data broadcast signal, among other signals. If desired, the broadcast signal may further include a broadcast signal combined with a TV or radio broadcast signal. The broadcast associated information may include information associated with a broadcast channel, a broadcast program, or a broadcast service provider. Furthermore, the broadcast associated information can be provided via a mobile communication network. In this case, the broadcast associated information can be received by the mobile communication module 412. The broadcast associated information can be implemented in various forms, e.g., an electronic program guide (EPG), an electronic service guide (ESG), and the like. The broadcast receiving module 411 may be configured to receive digital broadcast signals using broadcasting systems such as ATSC, DVB-T (Digital Video Broadcasting-Terrestrial), DVB-S (Satellite), MediaFLO (Media Forward Link Only), DVB-H (Handheld), ISDB-T (Integrated Services Digital Broadcast-Terrestrial), and the like. Optionally, the broadcast receiving module 411 can be configured to be suitable for other broadcasting systems as well as the above-noted digital broadcasting systems. The broadcast signal and/or broadcast associated information received by the broadcast receiving module 411 may be saved to the memory 460.

The mobile communication module 412 transmits/receives wireless signals to/from at least one of a base station, an external terminal, and a server via a mobile network. Such wireless signals may carry audio signals, video signals, and data of various types according to transceived text/multimedia messages.

The wireless Internet module 413 includes a module for wireless Internet access and may be internally or externally coupled to the mobile terminal 400. The wireless Internet technology can include WLAN (Wireless LAN) (Wi-Fi), Wibro (Wireless broadband), Wimax (World Interoperability for Microwave Access), HSDPA (High Speed Downlink Packet Access), and the like.

The short-range communication module 414 is a module for short-range communications. Suitable technologies for implementing this module include Bluetooth, radio frequency identification (RFID), infrared data association (IrDA), ultra-wideband (UWB), ZigBee, RS-232, RS-385 and the like.

The location information module 415 is a module for obtaining location information of the mobile terminal 100.

And, this module may be implemented with a global positioning system (GPS) module for example.

The audio/video (A/V) input unit 420 is configured to provide audio or video signal input. The A/V input unit 420 may include a camera 421, a microphone 422 and the like. The camera 421 receives and processes image frames of still pictures or video, which are obtained by an image sensor in a video call mode or a photographing mode. Furthermore, the processed image frames can be displayed on the display 451.

The image frames processed by the camera 421 can be stored in the memory 460 or transmitted externally via the wireless communication unit 410. Optionally, at least two cameras 421 can be provided according to the environment of usage.

The microphone 422 receives an external audio signal in call mode, recording mode, voice recognition mode, or the like. This audio signal is processed and converted into electrical audio data. The processed audio data is transformed into a format transmittable to a mobile communication base station via the mobile communication module 412 in call mode. The microphone 422 typically includes assorted noise cancelling algorithms to cancel noise generated in the course of receiving the external audio signal.

The user input unit 430 generates input data for a user to control an operation of the terminal. The user input unit 430 may include a keypad, a dome switch, a touchpad (e.g., static pressure/capacitance), a jog wheel, a jog switch, and/or the like.

The sensing unit 440 generates sensing signals for controlling operations of the mobile terminal 400 using status measurements of various aspects of the mobile terminal. For instance, the sensing unit 440 may detect an open/closed status of the mobile terminal 400, a location of the mobile terminal 400, an orientation of the mobile terminal 400, a presence or absence of user contact with the mobile terminal 400, an acceleration/deceleration of the mobile terminal 400, and the like. For example, if the mobile terminal 400 is moved or inclined, it is able to sense a location or inclination of the mobile device. Moreover, the sensing unit 440 may sense a presence or absence of power provided by the power supply unit 490, a presence or absence of a coupling or other connection between the interface unit 470 and an external device, and the like. Meanwhile, the sensing unit 440 may include a proximity sensor 441 such as NFC (near field communication) and the like.

The output unit 450 generates output relevant to the senses of vision, hearing and touch, and may include the display 451, an audio output module 452, an alarm unit 453, a haptic module 454, and the like.

The display 451 is typically implemented to visually display (output) information processed by the mobile terminal 400. For instance, if the mobile terminal is operating in phone call mode, the display will generally provide a user interface (UI) or graphical user interface (GUI) related to a phone call. For another instance, if the mobile terminal 400 is in video call mode or photographing mode, the display 451 may display photographed or/and received images or UI/GUI.

The display 451 may include at least one of a liquid crystal display (LCD), a thin film transistor-liquid crystal display (TFT-LCD), an organic light-emitting diode display (OLED), a flexible display and a three-dimensional display.

Some of the displays can be implemented in a transparent or optical transmittive type, which can be called a transparent display. A representative example of the transparent display is the TOLED (transparent OLED). A rear configuration of the display 451 can be implemented as the optical transmittive type as well. In this configuration, a user may be able to see an object located in rear of a terminal body through a region occupied by the display 451 of the terminal body.

Two or more displays 451 can be provided to the mobile terminal 400 in accordance with an implementation type of the mobile terminal 400. For instance, a plurality of displays can be disposed on the mobile terminal 400 in a manner of being spaced apart from a single face or being integrally formed on a single face. Alternatively, a plurality of displays may be disposed on different faces of the mobile terminal 400, respectively.

If the display 451 and a sensor (hereinafter called 'touch sensor') for detecting a touch action configure a mutual layer structure, the display 451 is usable as an input device as well as an output device. In this case, the touch sensor can be configured with a touch film, a touch sheet, a touchpad, or the like.

The touch sensor can be configured to convert a pressure applied to a specific portion of the display 451 or a variation of capacitance generated from a specific portion of the display 451 into an electrical input signal. Moreover, the touch sensor is configurable to detect pressure of a touch as well as a touched position or size.

If a touch input is applied to the touch sensor, signal(s) corresponding to the touch input is transferred to a touch controller. The touch controller processes the signal(s) and then transfers the processed signal(s) to the controller 480. Therefore, the controller 480 is able to know whether a prescribed portion of the display 451 is touched.

A proximity sensor 441 can be disposed on an inner region of the mobile device enclosed by the touchscreen or near the touchscreen. The proximity sensor is a sensor that detects a presence or non-presence of an object approaching a prescribed detecting surface or an object existing around the proximity sensor using an electromagnetic field strength or infrared ray without mechanical contact. Hence, the proximity sensor is more durable than a contact type sensor and also has utility higher than that of the contact type sensor.

The proximity sensor may include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor, etc. If the touch screen includes the electrostatic capacity proximity sensor, it is configured to detect the proximity of a pointer using a variation of an electric field according to the proximity of the pointer. In this configuration, the touchscreen (or touch sensor) can be sorted into a proximity sensor.

For clarity and convenience of explanation, an action for enabling the pointer approaching the touch screen to be recognized as placed on the touch screen may be named 'proximity touch' and an action of enabling the pointer to actually come into contact with the touch screen may be named 'contact touch'. And, a position, at which the proximity touch is made to the touch screen using the pointer, may mean a position of the pointer vertically corresponding to the touch screen when the pointer makes the proximity touch.

The proximity sensor detects a proximity touch and a proximity touch pattern (e.g., a proximity touch distance, a proximity touch duration, a proximity touch position, a proximity touch shift state). Information corresponding to the detected proximity touch action and the detected proximity touch pattern can be output to the touch screen.

The audio output module 452 functions in various modes including a call-receiving mode, a call-placing mode, a recording mode, a voice recognition mode, and a broadcast reception mode to output audio data which is received from the wireless communication unit 410 or stored in the memory 460. During operation, the audio output module 452 may output an audio signal related to a function (e.g., call received, message received) executed in the mobile terminal 400. The audio output module 452 may include a receiver, a speaker, a buzzer and the like.

The alarm unit 453 outputs a signal for announcing the occurrence of an event of the mobile terminal 400. Typical events occurring in the mobile device may include a call signal received, a message received, a touch input received, and the like. The alarm unit 453 may output a signal for announcing the event occurrence by way of vibration as well as video or audio signal. The video or audio signal can be outputted via the display 451 or the audio output module 452. Hence, the display 451 or the audio output module 452 can be sorted into a part of the alarm unit 453.

The haptic module 454 generates various tactile effects that can be sensed by a user. Vibration is a representative one of the tactile effects generated by the haptic module 454. The strength and pattern of the vibration generated by the haptic module 454 are controllable. For instance, different vibrations can be output in a manner of being synthesized together or can be output in sequence. The haptic module 454 is able to generate various tactile effects as well as the vibration. For instance, the haptic module 454 may generate an effect attributed to the arrangement of pins vertically moving against a contact skin surface, an effect attributed to the injection/suction power of air though an injection/suction hole, an effect attributed to the skim over a skin surface, an effect attributed to a contact with an electrode, an effect attributed to an electrostatic force, and an effect attributed to the representation of a hot/cold sense using an endothermic or exothermic device. The haptic module 454 can be implemented to enable a user to sense the tactile effect through a muscle sense of a finger or an arm as well as to transfer the tactile effect through direct contact. Optionally, two or more haptic modules 454 can be provided to the mobile terminal 400 in accordance with a configuration type of the mobile terminal 400.

The memory 460 may store a program for an operation of the controller 480, or may temporarily store inputted/outputted data (e.g., phonebook, message, still image, video, etc.). And, the memory 460 may store data of vibrations and sounds of various patterns outputted in response to a touch input to the touchscreen.

The memory 460 may be implemented using any type or combination of suitable volatile and non-volatile memory or storage devices, including hard disk, RAM, SRAM, EEPROM, EPROM, PROM, ROM, magnetic memory, flash memory, magnetic or optical disk, multimedia card micro type memory, card-type memory (e.g., SD memory or XD memory), or other similar memory or data storage device. Furthermore, the mobile terminal 400 is able to operate in association with the web storage for performing a storage function of the memory 460 on the Internet.

The interface unit 470 may play a role as a passage to every external device connected to the mobile terminal 400 with external devices. The interface unit 470 receives data from the external devices, delivers a supplied power to the respective elements of the mobile terminal 400, or enables data within the mobile terminal 400 to be transferred to the external devices. For instance, the interface unit 470 may include a wired/wireless headset port, an external charger port, a wired/wireless data port, a memory card port, a port for coupling to a device having an identity module, audio input/output ports, video input/output ports, an earphone port, and the like.

The identity module is a chip for storing various kinds of information for authenticating a use authority of the mobile terminal 400 and may include User Identify Module (UIM), Subscriber Identity Module (SIM), Universal Subscriber Identity Module (USIM), and the like. A device having the identity module (hereinafter called 'identity device') can be manufactured in form of a smart card. Therefore, the identity device is connectible to the mobile terminal 400 through a port.

When the mobile terminal 400 is connected to an external cradle, the interface unit 470 becomes a passage for supplying the mobile terminal 400 with a power from the cradle or a passage for delivering various command signals input from the cradle by a user to the mobile terminal 400. Each of the various command signals inputted from the cradle or the power can operate as a signal for recognizing that the mobile terminal 400 is correctly installed in the cradle.

The controller 480 typically controls the overall operations of the mobile terminal 400. For example, the controller 480 performs the control and processing associated with voice calls, data communications, video calls, and the like. The controller 480 may include a multimedia module 481 that provides multimedia playback. The multimedia module 481 may be configured as a part of the controller 480, or implemented as a separate component. Moreover, the controller 480 is able to perform a pattern recognition processing for recognizing a writing input and a picture drawing input performed on the touchscreen as a text and an image, respectively.

The power supply unit 490 is supplied with an external or internal power and then supplies a power required for an operation of each component, under the control of the controller 480.

Various embodiments described herein may be implemented in a recording medium readable by a computer or a device similar to the computer using software, hardware, or some combination thereof for example.

For hardware implementation, the embodiments described herein may be implemented within at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, and a selective combination thereof. Such embodiments may also be implemented by the controller 480.

For software implementation, the embodiments described herein may be implemented with separate software modules, such as procedures and functions, each of which performs one or more of the functions and operations described herein. The software codes can be implemented with a software application written in any suitable programming language and may be stored in memory such as the memory 460, and executed by a controller or processor, such as the controller 480.

Meanwhile, beyond the dimension of user's hand-held use, a wearable device wearable on a body may operate or function as a digital device or an external device in the present specification. Such wearable devices may include a smart watch, smart glasses, an HMD and the like.

As shown in FIG. 1, a wearable device may exchange data with or interwork with another device mutually. The short-communication module 414 may detect (or recognize) a communication enabled wearable device around. If the detected wearable device is a device authenticated to communicate with the mobile terminal 400, the controller 480 may send at least one portion of data processed in the mobile terminal 400 to the wearable device. Hence, a user can use the data processed in the mobile terminal 400 through the wearable device. For instance, if an incoming call is received by the mobile terminal 400, a phone call is performed through the wearable device. If a message is received by the mobile terminal 400, the received message can be checked through the wearable device.

FIG. 5 is a diagram showing a digital device or an external device according to another embodiment of the present invention.

Referring to FIG. 5, a watch-type mobile terminal, i.e., a smartwatch 500 includes a main body 501 with a display unit 551 and a band 502 connected to the main body 501 to be wearable on a wrist. Generally, the smartwatch 500 may include the features or similar features of the mobile terminal 400 shown in FIG. 4.

The main body 501 may include a case having a certain appearance. As illustrated, the case may include a first case 501a and a second case 501b cooperatively defining an inner space for accommodating various electronic components. Other configurations are possible. For instance, a single case may alternatively be implemented, with such a case being configured to define the inner space, thereby implementing a mobile terminal 500 with a uni-body.

The smartwatch 500 is configured to enable wireless communication, and an antenna for the wireless communication can be installed in the main body 501. The antenna may extend its function using the case. For example, a case including a conductive material may be electrically connected to the antenna to extend a ground area or a radiation area.

The display unit 551 is disposed on the front side of the main body 501 so as to output information. The display unit 551 may include a touch sensor so as to implement a touchscreen. As illustrated, a window 551a of the display unit 551 is mounted on the first case 501a to form a front surface of the terminal body together with the first case 501a.

An audio output module 552, a camera 521, a microphone 522, a user input unit 523 and the like can be provided to the main body 501. When the display unit 551 is implemented as a touchscreen, it may function as the user input unit 523, whereby a separate key may not be provided to the main body 501.

The band 502 is commonly worn on the user's wrist and may be made of a flexible material for facilitating wearing of the device. As one example, the band 502 may be made of leather, rubber, silicon, synthetic resin, and/or the like. The band 502 may also be configured to be detachable from the main body 501. Accordingly, the band 502 may be replaceable with various types of bands according to a user's preference.

Meanwhile, the band 502 may be used in extending the performance of the antenna. For example, a ground extending unit (not shown) electrically connected to the antenna to extend a ground area may be embedded in the band 502.

The band 502 may be provided with a fastener 502a. The fastener 502a may be implemented into a buckle type, a snap-fit hook structure, a Velcro (trade mark) type, or the like, and include a flexible section or material. The drawing illustrates an example that the fastener 502a of a buckle type is implemented.

Figure 6:
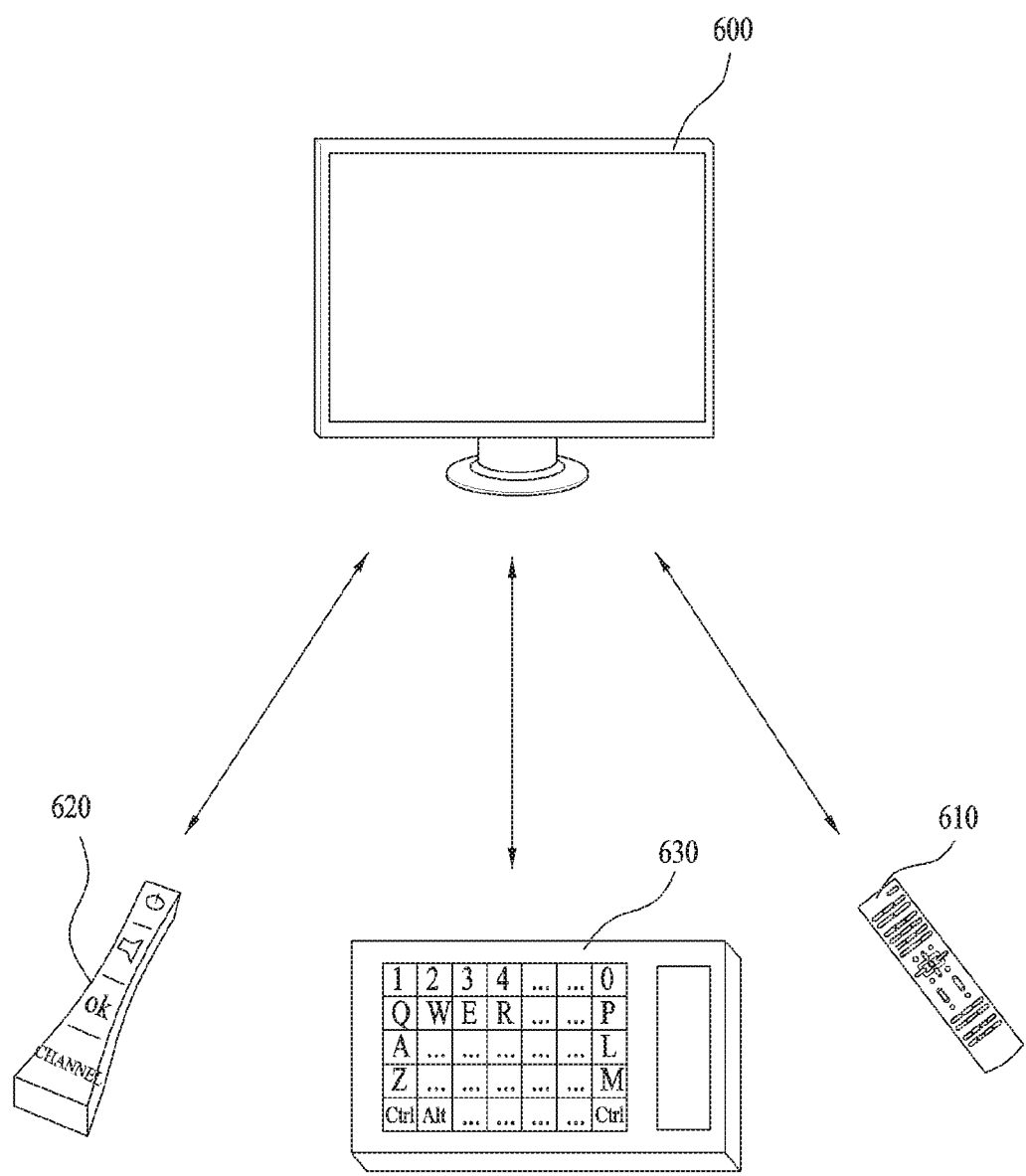
FIG. 6 is a diagram of a control means for controlling a digital device according to one embodiment of the present invention.

FIG. 6 is a diagram showing a control means for controlling a digital device according to one embodiment of the present invention.

In order to control a digital device 600, a front panel (not shown in the drawing) or a control means (e.g., an input means) provided to the digital device 600 is used.

Meanwhile, as a user interface device (UID) capable of a wire/wireless communication, the control means includes a remote controller 610, a key board 630, a pointing device 620, a touchpad, or the like, mainly embodied for the purpose of controlling the display device 600. And, a control means dedicated to an external input by being connected to the display device 600 may be included as well. Besides, the control means may further include a mobile device (e.g., a smartphone, a tablet PC, etc.) capable of controlling the display device 600 through a mode switching or the like despite not having the purpose of controlling the display device 600. For clarity, a pointing device is taken as one example for the description in the present specification, by which the present invention is non-limited.

The input means can communicate with the display device by employing at least one of communication protocols as necessary. In this case, the communication protocols may include Bluetooth, RFID, IrDA (infrared Data Association), UWB, ZigBee, DLNA, RS and the like.

The remote controller 610 is a general input means provided with various key buttons required for controlling the display device 600.

The pointing device 620 provided with a gyro sensor and the like delivers a prescribed control command to the display device 600 by embodying a corresponding pointer on a screen of the display device 600 based on a user's motion, a pressure, a rotation and the like. The pointing device 620 may be called one of various names such as a magic remote controller, a magic controller and the like.

As the display device 600 is an intelligence integrated display device capable of providing various services such as a web browser, an application, an SNS (social network service) and the like as well as broadcasts, it is difficult to control the display device 600 using a conventional remote controller 610. Hence, the keyboard 630 is embodied into a configuration similar to a PC keyboard to facilitate inputs of text and the like by complementing the control difficulty.

Meanwhile, the control means such as the remote controller 610, the pointing device 620, the keyboard 630, or the like is provided with a touchpad as necessary and is usable for the various control purposes of facilitating text inputs, pointer shifts, zoom-in/out of photo or video, and the like.

Hereinafter, various embodiment(s) of a data processing method in a digital device in accordance with the present invention will be described in more detail with reference to the accompanying drawings.

In this specification, various embodiments of data processing for controlling execution of a second application in a second digital device as well as the second digital device through a first application in a first digital device are disclosed in accordance with the present invention. In this case, for convenience of description, the first digital device will be described as an example of a mobile terminal and the second digital device will be described as an example of a digital TV. Also, the first application includes a digital TV control application, which substitutes for a remote controller which is a set of the digital TV, and the second application includes all data such as menu, application and content, which can be provided by the digital TV. Meanwhile, the digital TV control application is basically downloaded or/and installed in the mobile terminal to serve as a remote controller for digital TV control through the mobile terminal. Although the digital TV control application may be defined as various terms such as TV plus application, remote application, and remote controller application, the digital TV control application will be referred to as a TV plus application hereinafter. In addition, the mobile terminal may include a smartphone and a wearable device.

The data processing method of the digital device according to one embodiment of the present invention includes the steps of executing and displaying an application, receiving a menu request signal through a remote application executed by an external device, generating menu data by determining attributes of the receives menu request signal on the basis of the displayed application, transmitting the generated menu data to the external device and outputting the menu data through a screen of the external device, and transmitting or operating menu data corresponding to a menu item selection signal if the menu item selection signal output from the external device is received.

In this case, the digital device may not display a menu corresponding to the menu request signal of the external device on the screen. If the displayed application receives application data from a source device and provides the application data, the digital device may request the source device of a menu data request signal according to the received menu request signal.

The method may further include the steps of reading the displayed application data, converting the read application data to be matched with a format of the external device, and transmitting the converted application data to the external device.

Also, the digital device may transmit and output the converted application data together with the generated menu data in response to the menu request signal of the external device.

Whenever an event according to one or more menu items selected from the menu data output through the screen is generated, the external device may transmit a control command corresponding to the event to the digital device and display a response, which is returned and corresponds to the control command, on the screen.

Also, the external device may output change data according to each event according to one or more menu items selected from the menu data output through the screen, onto the screen, and may transmit the control command to the digital device to apply the change data according to all events at one time.

If the change data according to the event are output on the screen of the external device, the digital device may maintain a previous mode without applying the change data to the digital device or the application displayed by the digital device until the digital device receives the control command from the external device.

In addition, the menu items selected by the external device may relate to at least one of function and setup of the digital device or the application displayed by the digital device.

Figure 7:
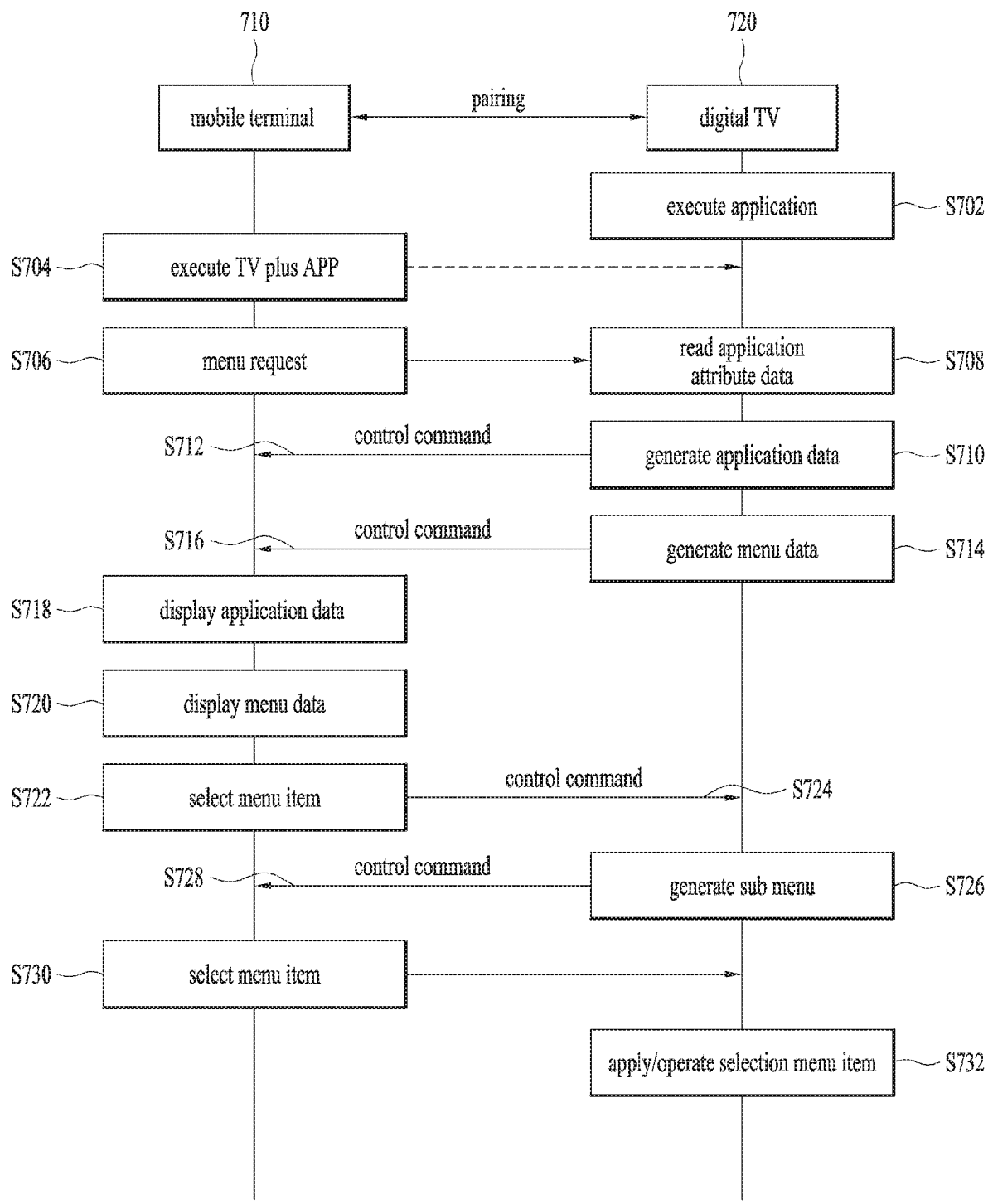
FIG. 7 is a flow chart illustrating a method for controlling a digital TV using a TV plus application in a mobile terminal according to one embodiment of the present invention.

FIG. 7 is a flow chart illustrating a method for controlling a digital TV using a TV plus application in a mobile terminal according to one embodiment of the present invention.

Referring to FIG. 7, a digital TV 720 executes an application (S702).

A mobile terminal 710 executes a TV plus application for controlling the digital TV 720 (S704). At this time, the mobile terminal 710 may notify the digital TV 720 that the TV plus application has been executed. The notification may indicate that the mobile terminal 710 may transmit a control command for controlling the digital TV 720 and include a pairing request for control command transmission and reception as described above.

The mobile terminal 710 transmits a menu request signal to the digital TV 720 through the executed TV plus application (S706). In this case, the menu may mean a menu of the digital TV 720, for example.

The digital TV 720 generates menu data in accordance with the menu request of the mobile terminal of the step S706 (S714). At this time, if an application is currently executed, the digital TV 720 reads data on attributes of the executed application when generating the menu data (S708), and also generates application data (S710). The application attribute data are intended to determine whether all menus are requested or a specific menu is requested, in accordance with the menu request of the step S706. Although this may be identified by parsing the menu request, the application attribute data are read for menu configuration if a specific menu according to the attributes of the application is requested like the case that a menu is requested through a remote controller. Meanwhile, the application data of the step S710 may mean data for transmitting audio/video data of the application, which is currently provided, as well as menu data in response to the menu request step of the step S706. The digital TV 720 transmits the control command, which includes the generated application data, to the mobile terminal 710 (S712), generates menu data in response to the menu request and the read application attribute data (S714), and transmits the control command including the generated menu data to the mobile terminal 710 (S716).

The mobile terminal 710 displays the received application data (S718), and also displays the transmitted menu data (S720).

If a predetermined menu item is selected from the displayed menu data (S722), the mobile terminal 710 generates a control command according to the selected menu item and transmits the generated control command to the digital TV 720. The menu data may include one or more menu items (S724).

The digital TV 720 applies a selection menu item to the digital TV 720 in response to the received control command according to menu item selection of the mobile terminal in accordance with the step S724 or performs an operation according to the control command (S724). In this case, if the digital TV 720 should provide a sub menu of the selected menu item as a result of parsing the control command of the step S724, the digital TV 720 generates sub menu data (S726) and again returns the control command including the generated sub menu data to the mobile terminal 710 (S728).

The mobile terminal 710 displays the returned sub menu data, and if a specific menu item within the displayed sub menu data is selected (S730), the mobile terminal 710 again transmits the control command including the selected specific menu item to the digital TV 720 (S732). The digital TV 720 applies the selected menu item to the digital TV 720 or performs the operation according to the selected menu item in accordance with the control command received through the step S732 (S734).

The mobile terminal 710 and the digital TV are paired with each other for the aforementioned data communication. Also, execution of the application of the step S702 in the digital TV 720 should not always be preceded.

Meanwhile, the digital TV 720 may request a menu or select a menu item after the mobile terminal 710 executes a TV plus application, and thus may continue to provide only an application which is being provided in the initial step S702 without providing related application data, that is, menu data on the screen during a procedure of returning a control command or data corresponding to the requested menu or the selected menu item. This will described in more detail with reference to the following drawings.

Figure 8:
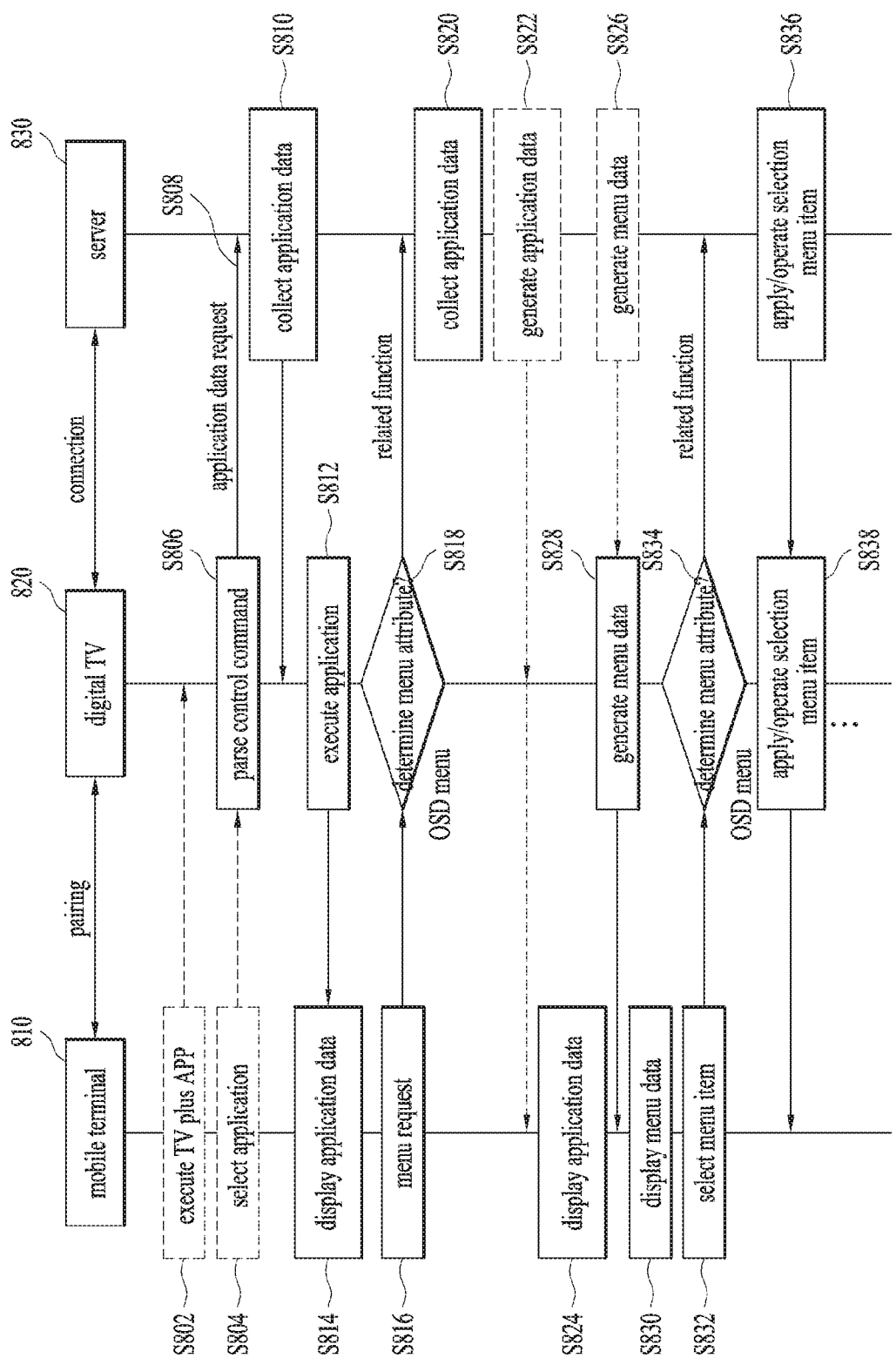
FIG. 8 is a flow chart illustrating a method for controlling a digital TV using a TV plus application in a mobile terminal according to another embodiment of the present invention.

FIG. 8 is a flow chart illustrating a method for controlling a digital TV using a TV plus application in a mobile terminal according to another embodiment of the present invention.

Unlike FIG. 7, in FIG. 8, the mobile terminal 810 does not always perform data communication with the digital TV 820 only, and the digital TV 820 simply displays application data in accordance with application and the application data is actually managed by a server 830. The server 830 will be described as an example, but may be applied to even the case that additional digital device in addition to the digital TV 820 involves in a service system.

Referring to FIG. 8, the mobile terminal 810 may be paired with the digital TV 820, and the digital TV 820 may be connected with an external server 830. In this case, the mobile terminal 810 may be connected with the external server 830 directly or indirectly. Meanwhile, a pairing method or data communication method between the mobile terminal 810 and the digital TV 820 may be the same as or different from connection method or data communication method between the digital TV 820 and the external server 830. In this case, a relay or gateway may be included in the method if necessary. If necessary, data are properly converted by a predetermined device, whereby data communication may be performed.

The mobile terminal 810 executes a TV plus application (S802). In this case, the mobile terminal may notify the digital TV 820 of the execution of the TV plus application. The digital TV 820 may deliver the notification of the mobile terminal 810 to the external server 830 in accordance with an application. On the contrary, the mobile terminal 810 may not notify the execution of the TV plus application.

The mobile terminal 810 selects an application, which will be executed in the digital TV 820, from the executed TV plus application and transmits a control command including data on the selected application to the digital TV 820 (S804).

The digital TV 820 parses the transmitted control command (S806). As a result of parsing of the control command, if the digital TV 820 does not store application data for corresponding application execution, such as VOD, or should receive the application data from the external server 830, the digital TV 820 requests the external server 830 of the application data (S808).

The external server collects the corresponding application data in accordance with the request of the digital TV 820 of the step S808 (S810), and returns the collected application data.

The digital TV 820 executes an application on the basis of the application data returned from the external server 830 in response to the request of the step S808 (S812).

The mobile terminal 810 may receive the application data executed in the digital TV 820 in accordance with the step S812 and provide the same application execution screen on the screen of the mobile terminal 810. Meanwhile, if the mobile terminal 810 requests a menu through the executed TV plus application (S816), the digital TV 820 determines an attribute of the menu by parsing the menu request of the mobile terminal (S818). In this case, the attribute of the menu may mean OSD menu capable of being provided by the digital TV 820, for example, or a menu which should be received from the external server 830.

If the attribute of the menu corresponds to menu data on a function of a corresponding application or application list, which should be received from the external server, as a result of the step S816, the digital TV 820 requests the external server 830 of the menu data. The external server 830 collects (S820) and generates (S822) the application data in accordance with the request, and returns the generated application data to the digital TV 820 or/and the mobile terminal 810. The digital TV 820 or the mobile terminal may display the returned application data (S824). Meanwhile, the external server 830 collects and generates menu data in accordance with the request and returns the generated menu data to the digital TV 820 (S826). In the step S828, the menu data may directly be returned from the external server 830 to the mobile terminal 810. Meanwhile, the step S820 and the step S822 may be skipped if the menu data are only provided.

The mobile terminal 810 displays the menu data (S830), and receives a predetermined menu item selected from the displayed menu data (S832). If the mobile terminal 810 generates a control command on the selected predetermined menu item and transmits the control command to the digital TV 820, the digital TV 820 determines and processes the attribute of the menu in the same manner as the aforementioned step S818. Meanwhile, if a menu of application or operation of the selected menu item is determined as a result of determination of the menu attribute, the digital TV 820 directly processes the menu or processes the menu by receiving the data of the external server 830 (S836, S838).

Figure 9:
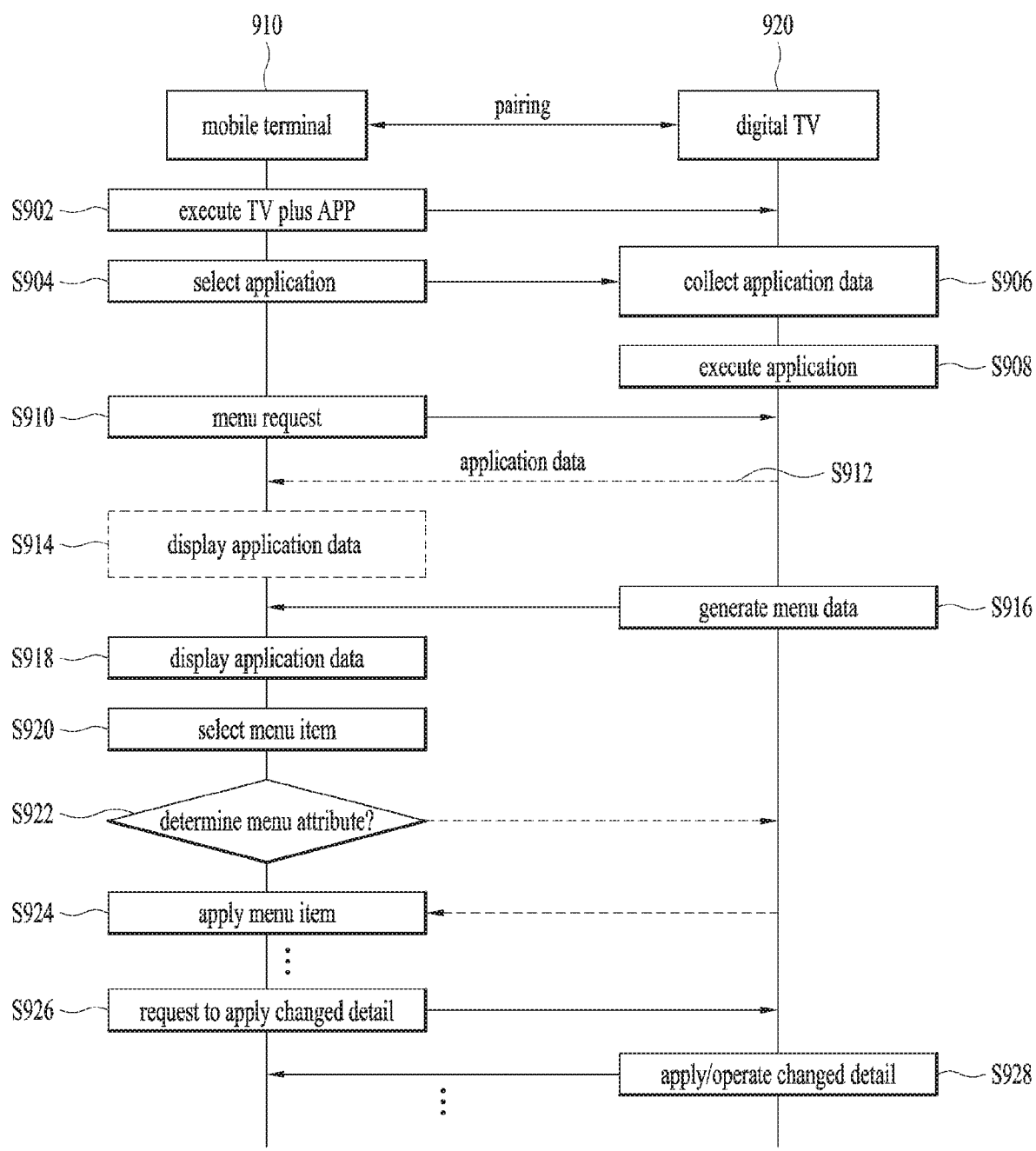
FIG. 9 is a flow chart illustrating a procedure of processing a control content for a digital TV or a menu of an application, which is being executed by the digital TV, at one time.

FIG. 9 is a flow chart illustrating a procedure of processing a control content for a digital TV or a menu of an application, which is being executed by the digital TV, at one time.

For understanding and convenience of the present invention, a relation between the mobile terminal and the digital TV will be described as an example in FIG. 9 in the same manner as FIG. 7. However, these technical spirits of the present invention may equally or similarly be applied to even the case that the external server, that is, the source device is not the digital TV as shown in FIG. 8.

In the embodiment of FIG. 9, menu data, setup data and function data (hereinafter, referred to as menu data) of the digital TV 920 are provided by the mobile terminal 910 not the digital TV 920, and details changed through the menu data are not always processed by the mobile terminal 910 through data communication with the digital TV 920 and finally changed details are applied at one time. Meanwhile, in this case, the mobile terminal 910 may provide changed details according to the user's selection prior to the final determination through the screen of the mobile terminal 910 every selection, whereby convenience of the user may be devised. However, the mobile terminal 910 may process the changed details so as not to be selected if the changed details are not able to be processed due to a difference from the digital TV 920 in hardware, software, etc., or may receive and display data processed from the digital TV 920. However, in this specification, it is assumed that the menu data are able to be processed by the mobile terminal 910.

Referring to FIG. 9, the mobile terminal 910 executes the TV plus application (S902), and if a predetermined application is selected through the executed TV plus application, the mobile terminal 910 transmits a control command for requesting execution of the selected application (S904).

The digital TV 920 collects application data for execution of the corresponding application in accordance with the control command received through the step S904 (S906) and provides an application execution screen (S908).

If a menu is selected through the executed TV plus application, the mobile terminal 910 transmits the control command for providing the selected menu to the digital TV 920 (S910).

In this case, in accordance with execution of the TV plus application, if the digital TV 920 transmits the application data to the mobile terminal 910, the mobile terminal 910 may display the application data on the screen of the mobile terminal 910 (S914).

The digital TV 920 generates and returns the menu data in accordance with the menu request of the mobile terminal 910 (S916). The mobile terminal 910 displays the returned menu data (S918).

Afterwards, if a predetermined menu item is selected from the displayed menu data (S920), the mobile terminal 910 determines attribute of the selected menu item (S922). In this case, the procedure of determining attribute of a menu item of the mobile terminal is intended to determine a request of menu data to the digital TV 920 in accordance with the selected menu item. Meanwhile, the mobile terminal 922 may skip the procedure of determining attribute of a menu item in the step S922. This is because that the mobile terminal 910 may not need the corresponding procedure if the mobile terminal 910 previously receives and stores all of related menu data from the digital TV 920 in the menu request step.

The mobile terminal 910 applies the selected menu item on the screen as it is (S924). In the step S920, the step S924 may be performed only on the screen of the mobile terminal not the screen of the digital TV 920. If a user requests the mobile terminal 920 to apply changed details, the mobile terminal 920 transmits a corresponding control command to the digital TV 920, and the digital TV 920 identifies the changed details previously applied by the mobile terminal 910 and then applies the identified details at one time.

Figure 10:
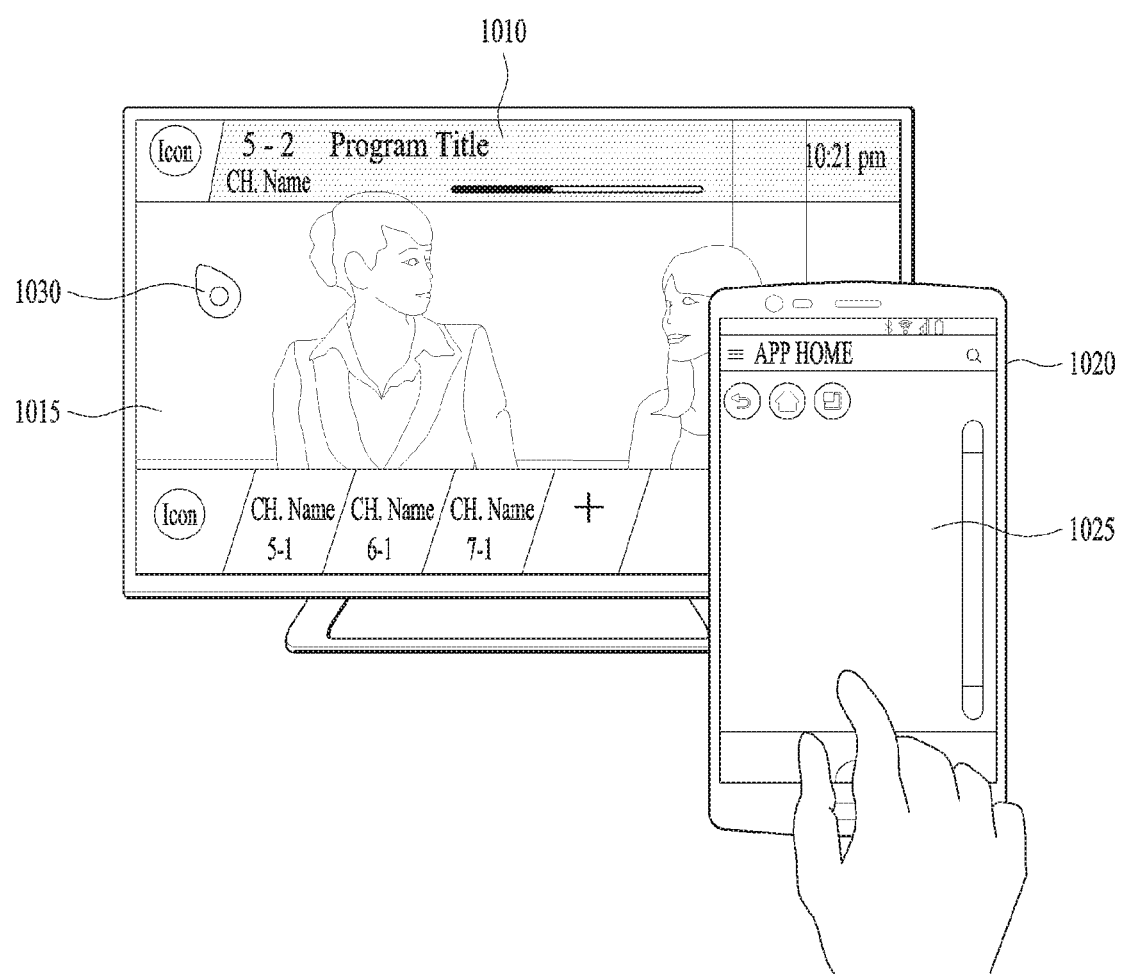
Figure 12:
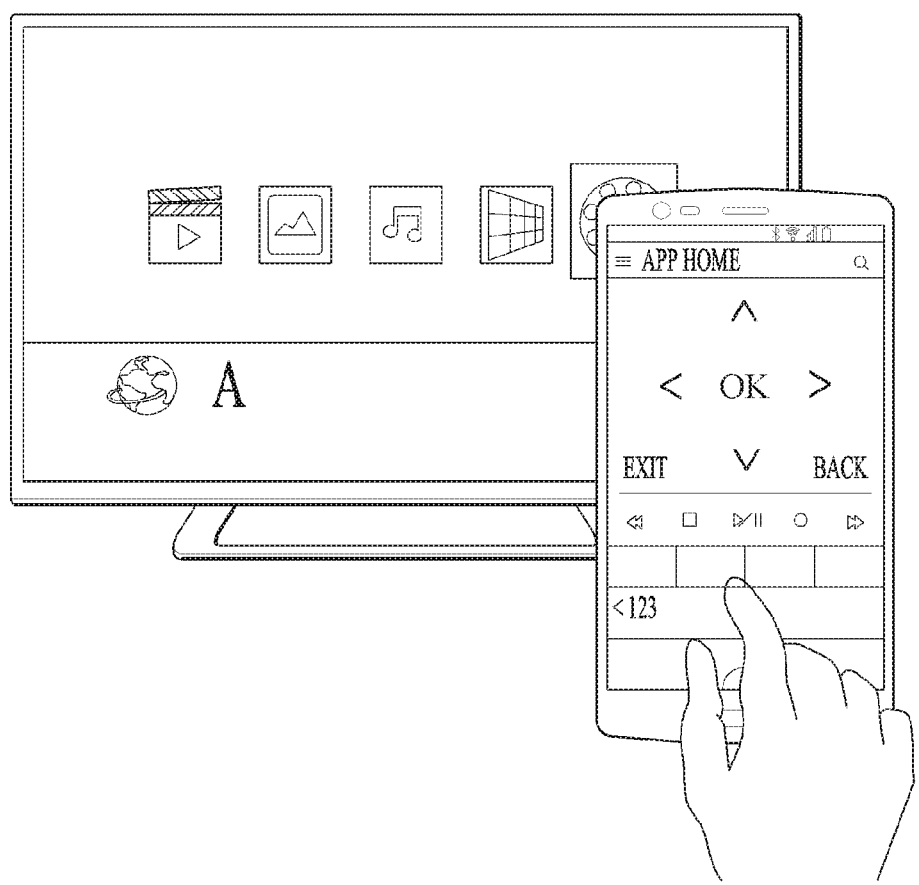

Hereinafter, FIGS. 10 to 12 illustrate service scenarios that include a user interface for a data processing procedure related to at least one scheme of FIGS. 7 to 9, which is described in accordance with the embodiment of the present invention.

Referring to FIG. 10, a digital TV 1010 provides an application screen through a screen 1015. At this time, if a TV plus application is executed by the mobile terminal 1020 and a menu request is transmitted to the digital TV 1010 through the executed TV plus application, the digital TV 1010 outputs menu data on an application execution screen 1015 which is being provided. In this case, if the menu data are provided on the screen of the digital TV 1010, the mobile terminal 1020 may provide a touch pad for controlling a pointer 1030 on the screen 1025. In this case, the mobile terminal 1020 may provide the menu data, which are being provided through the screen of the digital TV, before providing the touch pad or together with the touch pad. In other words, the mobile terminal 1020 may be switched to the screen for providing the touch pad if pointer control is required.

In FIG. 11, if the mobile terminal requests the digital TV of a menu through the TV plus application, the menu is provided only on the mobile terminal not the digital TV unlike FIG. 11. At this time, in FIG. 11, only the menu data may be provided on the mobile terminal, or the application execution screen which is being provided by the digital TV may be provided together with the menu data.

FIGS. 11a and 11b illustrate that a menu is varied depending on a menu type, menu attribute, selected by the mobile terminal through the TV plus application. Meanwhile, FIGS. 11a and 11b may be have a relation such as a relation between menu and sub-menu. For example, a menu according to a specific menu item selection in FIG. 11a may be menu data of FIG. 11b. In this case, the digital TV provides an application execution screen which is being previously provided continuously by menu selection of the mobile terminal without change. Meanwhile, the digital TV may temporarily stop execution of an application during control such as menu selection of the mobile terminal. Also, if the corresponding application is a real-time application such as live broadcasting when execution of the application is stopped, a time-machine function may be executed automatically.

FIG. 12 illustrates an embodiment for a case that a general OSD menu requested after the mobile terminal executes a TV plus application is provided on only the mobile terminal.

Figure 13:
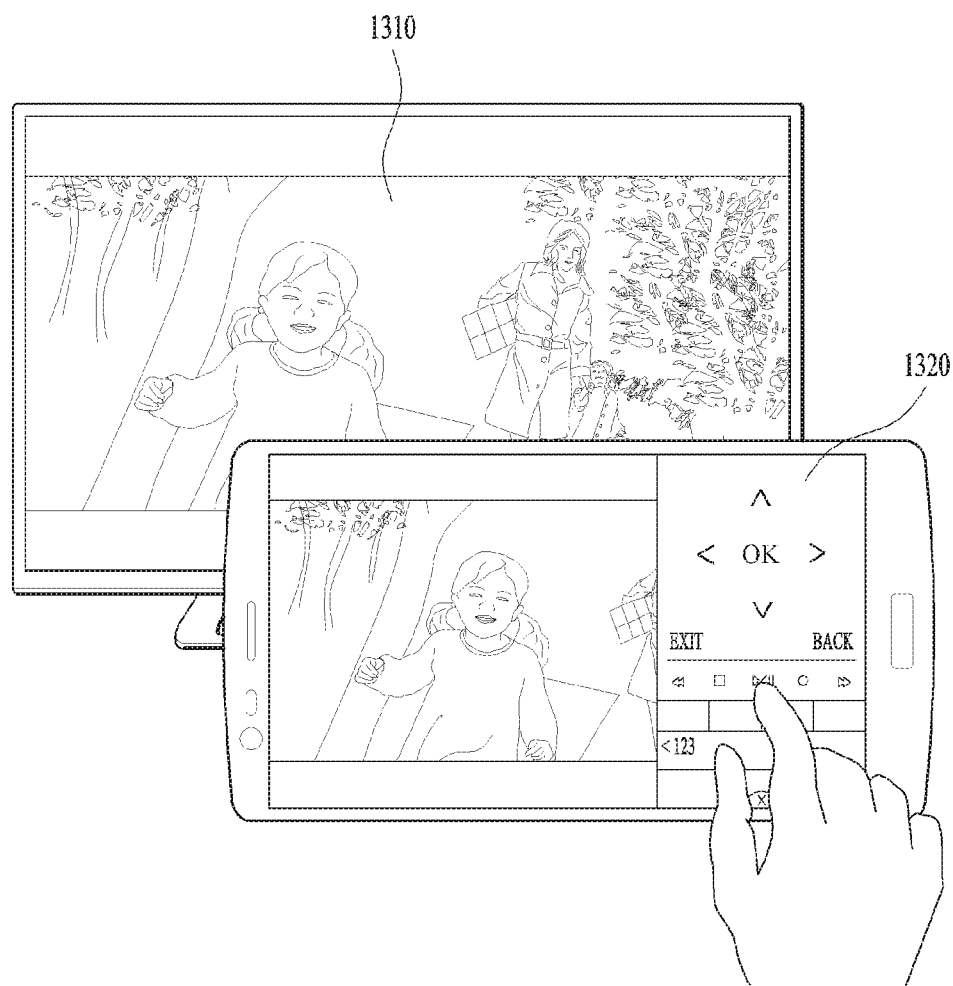

On the contrary, FIG. 13 illustrates that a source device of an application which is being currently provided on the digital TV is an external server in the same manner as FIG. 8. Unlike that FIG. 12 relates to a general ODS menu, that is, a menu capable of being provided by the digital TV, FIG. 13 illustrates that a menu 1320 requested by the mobile terminal is able to be provided by the external server.

In this case, as described above, the mobile terminal executes the TV plus application, and a user requests the digital TV of a menu on a specific application through the executed TV plus application. The digital TV determines attribute of a menu request of the mobile terminal, and if it is difficult to process the attribute of the menu request, that is, if the source device of the application which is being executed is an external server, the digital TV delivers the menu request of the mobile terminal to the external server. The external server collects and generates menu data in response to the delivered menu request of the mobile terminal and returns the generated menu data to the mobile terminal directly or through the digital TV. The mobile terminal decodes the returned menu data and provides the menu 1320 on the screen.

Afterwards, a function and operation corresponding to the menu item provided on the screen of the mobile terminal are performed similarly to the aforementioned procedure. That is, a control command corresponding to a menu item selected by the user is transmitted to the digital TV, and if the digital TV again transmits the control command to the external server, the external server returns a response to the control command. Then, the mobile terminal and the digital TV perform function, operation, etc. in accordance with the response.

Figure 14:
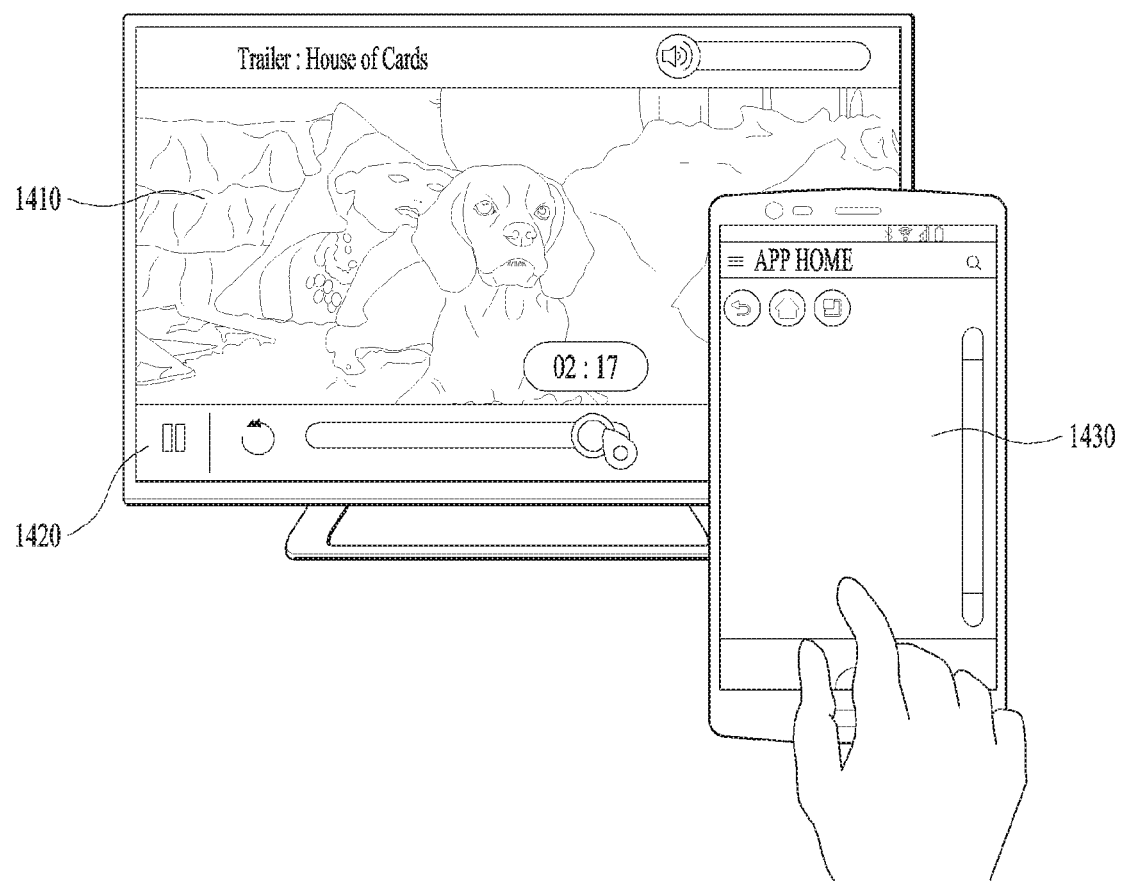

In FIG. 14, if the mobile terminal executes and notifies the TV plus application similarly to FIG. 12, the digital TV may request to perform a related function in accordance with an attribute of an application which is being currently executed. For example, if the user is viewing a video 1410 through the digital TV of FIG. 14 or if a menu 142 for function control while the user is viewing the video is being provided, the fact of execution of the TV plus application is notified from the mobile terminal. In this case, the digital TV may request the mobile terminal to provide the video 1410 or a touch pad 1430 for controlling a function control menu 1420 of the video and guide an input through the touch pad 1430. The digital TV may control an operation, that is, play the video in response to the user's input of the mobile terminal through the touch pad 1430.

Figure 15:
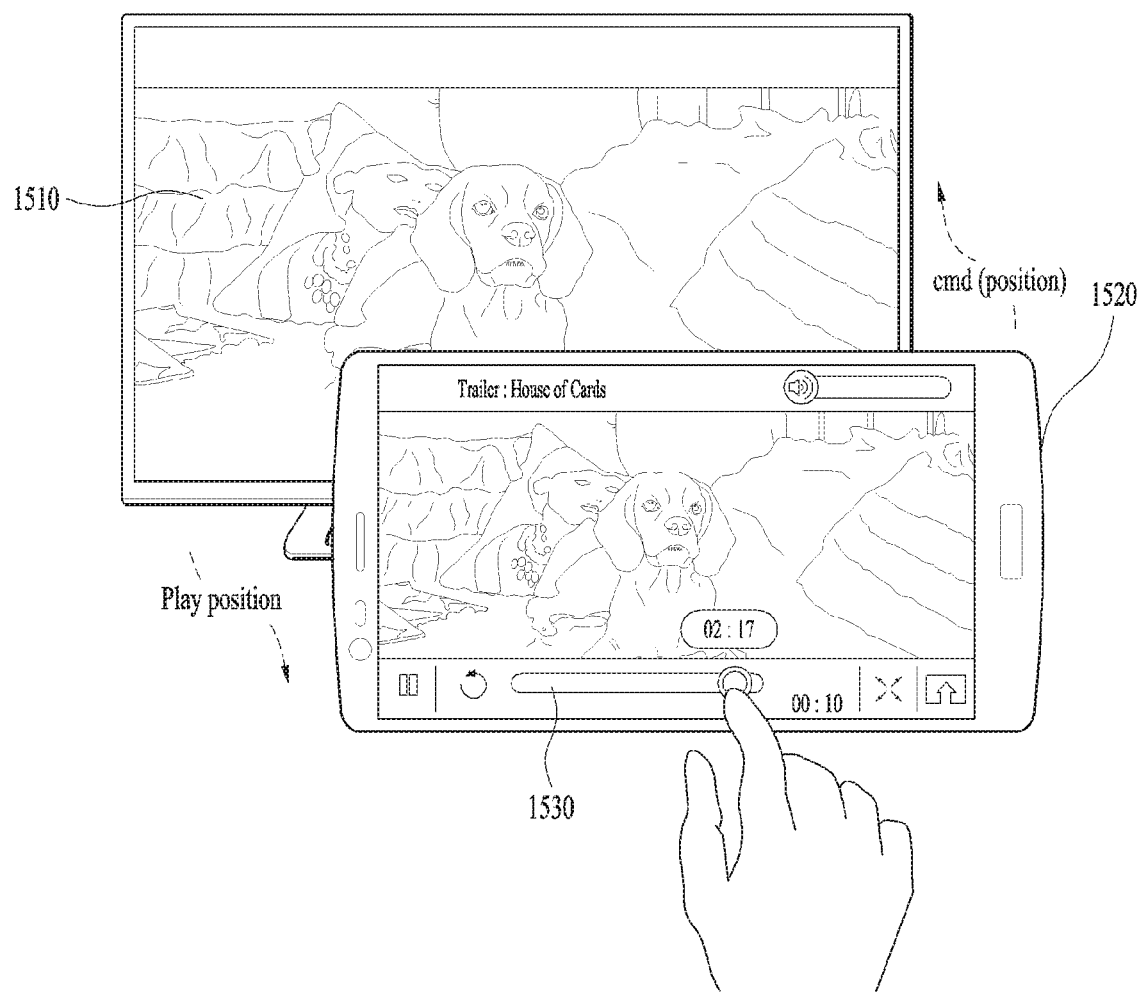

In FIG. 15 unlike FIG. 14, if a digital TV 1510 is playing a video, a mobile terminal 1520 executes a TV plus application and requests a menu for play control of the video, which is being played by the digital TV 1510, through the executed TV plus application, a video play control menu 1530 is played on the mobile terminal 1520 not the digital TV 1510. At this time, only the video play control menu 1530 may be provided on the mobile terminal 1520, or a video which is being played by the digital TV 1510 may be provided together with the video play control menu 1530. The determination as to providing the video play control menu and the video may be performed by the digital TV 1510. In other words, the digital TV 1510 may provide video data played by the mobile terminal 1520 separately from the menu in accordance with a predetermined matter or a request for a video through the TV plus application which is being executed by the mobile terminal 1520. At this time, the video data may be provided through a root different from the menu. For example, the video data may be transmitted in a Wi-Fi mode or a Wi-FI Direct mode but the menu may be transmitted in accordance with another communication protocol in the same manner as Bluetooth mode. Meanwhile, if the mobile terminal 1520 which has requested the play control menu is located within the range that the current screen of the digital TV can be viewed, that is, within predetermined coverage of the digital TV, the digital TV 1510 simply provides the requested play control menu 1530. However, if not so, it is preferable that the digital TV 1510 provides the play control menu 1530 together with the video data for control convenience through the play control menu. This determination may similarly be applied to the mobile terminal, the digital TV and the external server according to the present invention. Meanwhile, the determination may be applied even in the case that the menu is provided. For example, if the digital TV is not located within coverage of the digital TV or coverage of the mobile terminal during determination of menu attribute, attribute of a request detail is determined. If a wrong request is determined, the request may again be performed.

Hereinafter, FIGS. 16 to 20 illustrate a scenario for a data processing method described with reference to FIG. 9.

In other words, the mobile terminal changes setup, function, menu, etc. to control the digital TV, the mobile terminal immediately transmits a control command for the changed details to the digital TV, whereby the changed details may be applied immediately. Unlike this case, FIGS. 16 to 20 are intended that the changed details are applied to the digital TV or an application, which is being played by the digital TV, at one time after all changes are ended. For example, the changed details may be applied in the case that a second input is made within a predetermined time after a user of the mobile terminal performs a first input for controlling the digital TV, or conflicts with the first input. Meanwhile, this application may be made through an application key button provided on the mobile terminal. Also, there is no change on the digital TV with respect to control inputs through the mobile terminal before the application key button is pushed, and the corresponding changed data may be identified through the mobile terminal. As described above, if it is difficult to apply the changed details to be identified by the user in accordance with a difference in hardware or/and software on the mobile terminal and the digital TV and a change request of the user of the mobile terminal, related menu items may be disabled so as not to be selected, may be processed through the digital TV, a corresponding detail may be changed and applied onto the digital TV, or a guide GUI may be output to allow the user to recognize the above status.

Referring to FIG. 16a, the digital TV provides a broadcast program A of a tuned channel 5-2. The mobile terminal executes the TV plus application in accordance with selection of the user, and request the digital TV of a menu for controlling the digital TV through the executed TV plus application. The digital TV provides the mobile terminal with a menu together with a screen of the broadcast program A of the channel 5-2 as shown in accordance with the menu request.

The mobile terminal provides a menu for channel change in accordance with an application attribute, and if the user selects a menu item 1610 for change to another channel not the channel 5-2 which is previously viewed through the digital TV, from the menu for channel change, the mobile terminal provides a changed channel corresponding to the menu item 1610. In this case, the mobile terminal may provide the screen with channel information 1620 which is currently provided on the digital TV, for convenience of selection of the menu item for channel change.

Meanwhile, if the mobile terminal has a TV processing module therein, for example, the user may directly tune a channel selected by the user and provide a broadcast program of the corresponding channel. On the other hand, if the mobile terminal has no the TV processing module, the mobile terminal transmits channel information according to selection of the user to the digital TV. The digital TV determines a reserved state of a resource in accordance with the transmission, and if there are an available tuner, a decoder, etc., the digital TV tunes/decodes the corresponding channel in accordance with the transmitted channel information and returns data to the mobile terminal. Therefore, the mobile terminal provides the corresponding data onto the screen. Meanwhile, if an available resource is not sufficient in accordance with a channel change request including channel information of the mobile terminal, the digital TV may return a response to allow the user of the mobile terminal to identify a standby of the request or impossible response to the request in accordance with the insufficient resource. Meanwhile, in this case, the broadcast program A of the channel 5-2 may still be provided to the screen of the digital TV. On the contrary, if a channel change request of the mobile terminal is received and if it is determined that the resource is not sufficient as described above, the digital TV may stop from providing the broadcast program A of the channel 5-2 which is previously provided at the time when the channel change request is received, that is, temporarily stop play and change the resource for a response according to the channel change to be temporarily available, whereby the digital TV may play a broadcast program A of a channel X, which is previously provided, after responding to the request. In this case, the program A of which play has been stopped may be processed by time-machine depending on whether the resource is available.

Referring to FIG. 16b, it is intended to display a channel, which is finally determined after changed channel information is identified on the mobile terminal through channel change of one time or several times through FIG. 16a, through the digital TV. In this case, if the application key button 1630 provided on the mobile terminal is selected, as shown, the channel 5-2 which is previously viewed is changed to a requested channel 11-1, and a GUI 1640 requiring whether to apply the channel 11-1 to the digital TV is provided. Afterwards, a program B of the channel 11-1 is provided through the digital TV in accordance with selection of the user. The GUI 1640 may be provided to identify change to the channel currently provided on the mobile terminal when no input is received within a predetermined time after the user controls channel change of one or several times. Therefore, channel information 1650 on the changed channel may also be provided on the digital TV.

At this time, although not shown, information on a channel viewed by the user for a predetermined time or more prior to the finally determined channel may be provided onto the digital TV in the form of PIP (Picture in Picture), PBP (Picture by Picture), or history channel data.

Figure 17:
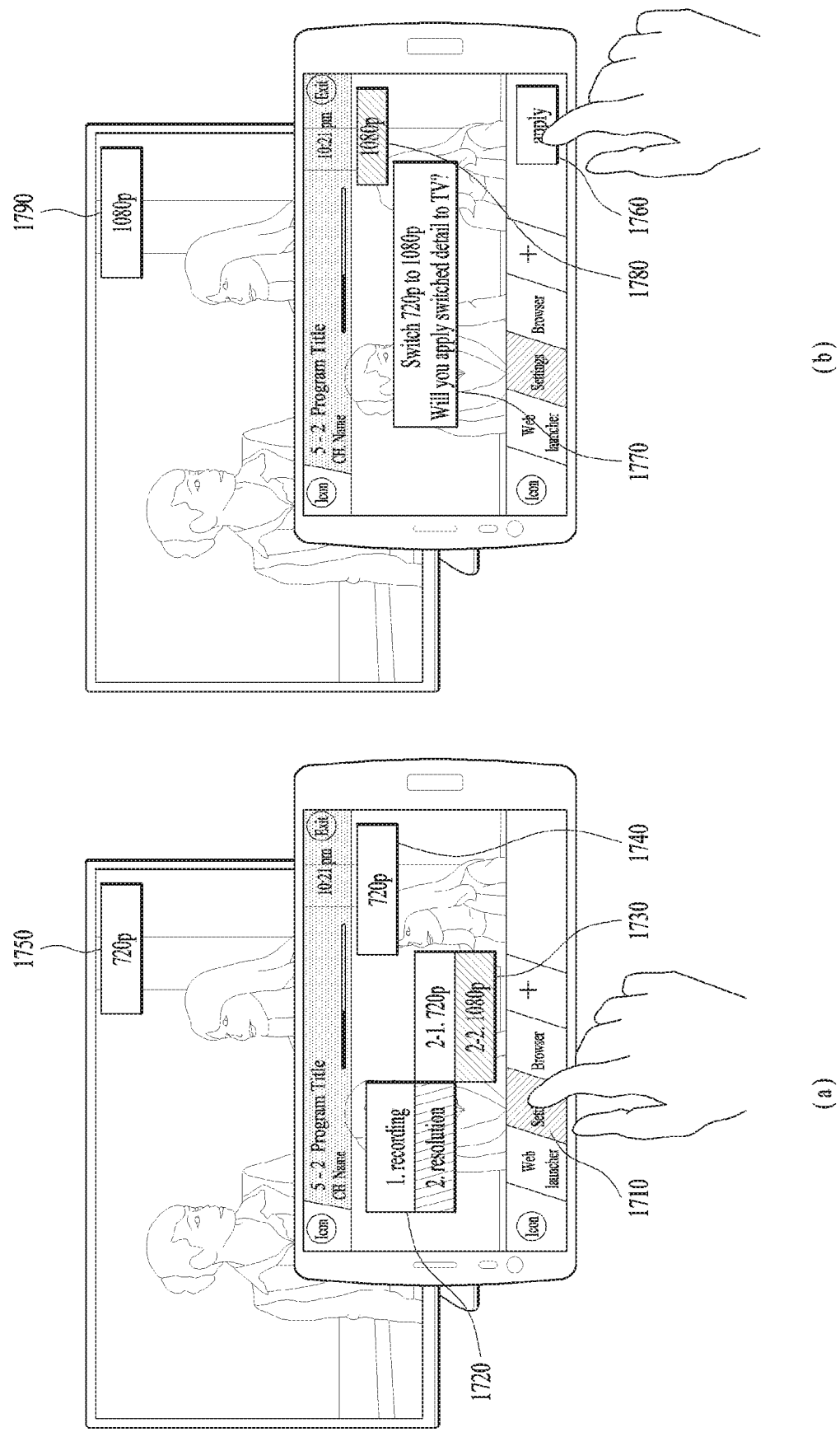

FIG. 16 relates to channel change, whereas FIG. 17 relates to a change of a setup detail such as display attribute.

Referring to FIG. 17a, after a menu is provided through execution of a TV plus application, if the mobile terminal selects a setup menu item 1710 for setup change from the provided menu, a first setup menu GUI 1720 including setup menus such as recording and resolution is provided. If a resolution menu item is selected from the first setup menu GUI 1720, a second setup menu GUI 1730 is provided. If the second setup menu GUI 1730 is provided, a resolution identifier 1740 for an application currently viewed by the user or resolution currently set to the digital TV is provide onto the screen of the mobile terminal. At this time, a resolution identifier 1750 may also be provided to the digital TV.

If resolution of the digital TV or application currently viewed by the user is 720p and a 1080p menu item on the second setup menu GUI 1730 is selected to change 720p to 1080p, as shown in FIG. 17b, resolution of a viewing application provided through the digital TV is changed to 1080p and the resolution identifier 1740 of FIG. 17a is changed to a resolution identifier 1780 of FIG. 17b in accordance with the change. Meanwhile, resolution of 1080p is applied to the application provided on the screen of FIG. 17b, and resolution of the application provided on the screen of FIG. 17a is 720p as described above. At this time, resolution of 720p is continuously applied to the digital TV in accordance with the present invention.

Afterwards, if the user of the mobile terminal changes resolution of 1080p to another resolution or selects another setup item not resolution and then does not perform any input for a preset time or selects an application key button 1760 provided onto the mobile terminal of FIG. 17b, a guide GUI 1770 for requiring whether to apply the changed details in FIGS. 17a and 17b at one time may be provided and the corresponding changed details may immediately be applied to the digital TV in accordance with selection.

Meanwhile, if it is intended to apply the changed details through the guide GUI 1770 or not and a plurality of changed details are provided, the changed details may be provided to be selectively applied. For example, among the changed details, change of resolution may be applied but change of recording time may not be applied. Meanwhile, if resolution is applied several times within change of resolution, a finally changed detail is not always applied but a detail, which is previously applied, may be selectively applied.

Figure 18:
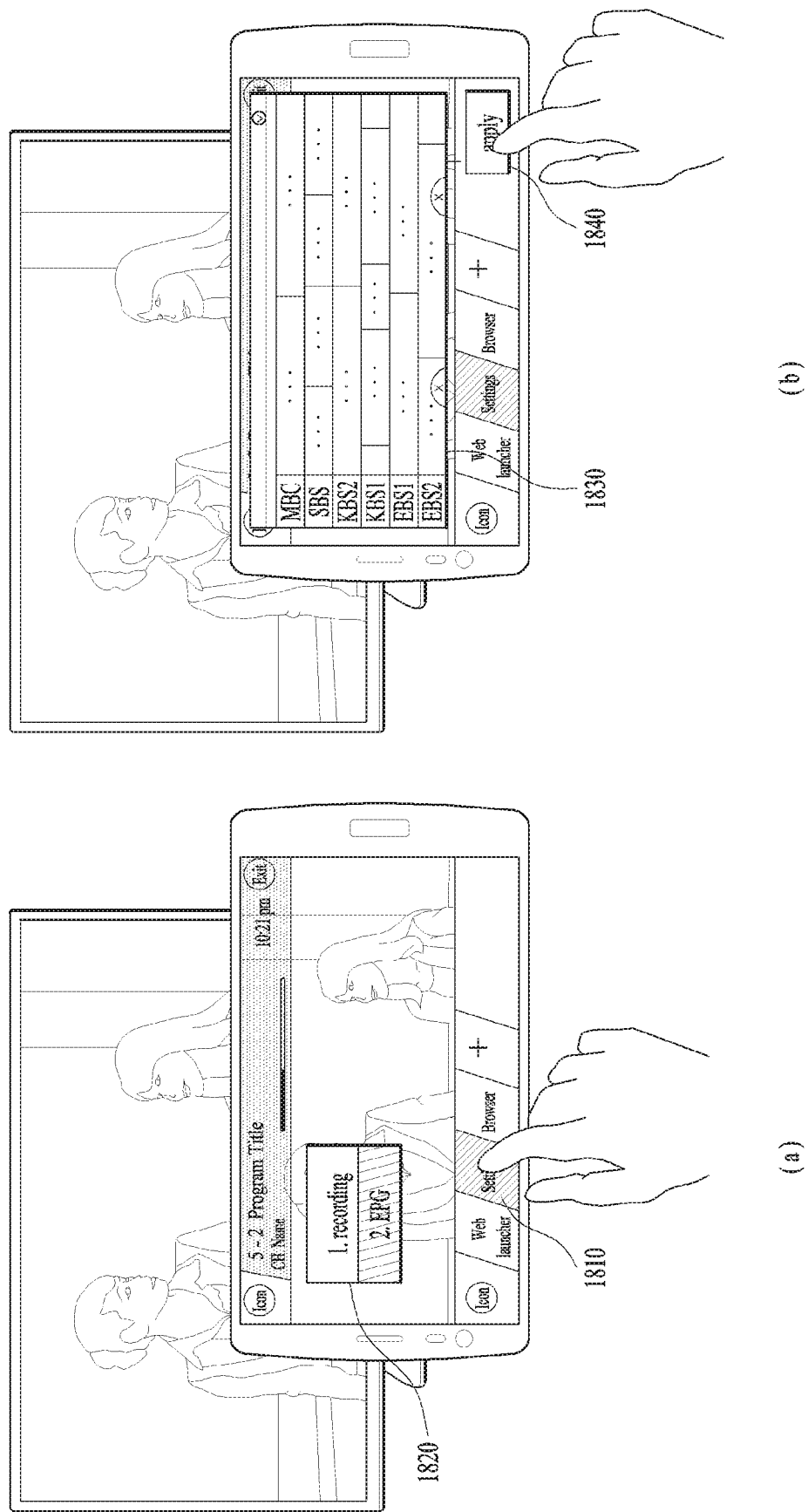

FIG. 18 relates to an embodiment for providing EPG and selective control.

Referring to FIG. 18a, after a menu is provided through execution of the TV plus application, if the mobile terminal selects a menu item 1810 for requesting EPG or recording setup is selected from the provided menu, a setup menu GUI 1820 including setup menus such as recording and EPG is provided. If the EGP menu item is selected from the setup menu GUI 1820, as shown in FIG. 18b, EPG data 1830 are provided only on the screen of the mobile terminal.

FIG. 19 is an embodiment for recording reservation of a digital TV using a TV plus application of a mobile terminal.

If the TV plus application is executed in the mobile terminal and a predetermined menu item 1910 is selected through the executed application, a control command according to the selection is transmitted to the digital TV, and a response corresponding to the transmission is received by the digital TV, whereby setup menu data are displayed on the screen of the mobile terminal as shown in FIG. 19a. In this case, as the setup menu data, menu items for setup such as resolution and recording are displayed as a first menu 1920, and if a recording setup menu item among the menu items is selected, sub menu items such as immediate recording, reserved recording, and reserved viewing are displayed as a second menu 1930 for recording setup in accordance with the selection.

If an immediate recording menu item is selected from the second menu 1930 provided through the mobile terminal of FIG. 19a, the mobile terminal transmits a control command for immediate recording from the current time with respect to the application currently viewed by the user in accordance with the selection. The digital TV starts recording of the application currently provided in accordance with the immediate recording control command from the current time and stores the recorded application in a memory. At this time, an identifier or icon for displaying that recording is currently performed may be displayed on some area within the screen of the digital TV or/and the mobile terminal. Meanwhile, the digital TV provides a guide GUI for requiring whether recording continues to be performed or ended before play of the application which is being recorded or a broadcast program is ended.

On the contrary, if the reserved recording menu item is selected from the second menu 1930 through the mobile terminal of FIG. 19a, the mobile terminal may provide a reserved recording setup GUI 1940 as shown in FIG. 19b. At this time, the reserved recording setup GUI 1940 is provided to select categories such as channel, program and time. Therefore, if a channel item is selected from the reserved recording setup GUI 1940, the channel item is provided to surf a desired channel through touch, gesture, voice, up/down key button, etc. by starting from the current channel. However, if the channel item is not disabled and an input for a channel is not performed, the currently provided channel is processed as a default channel. Although the term 'channel' has been used as above, the channel may be replaced with various types such as external input. Also, if the channel is determined, program items that may be provided by the corresponding channel may be determined. Reserved recording setup may be processed at a corresponding time of a corresponding program of a corresponding channel in accordance with a time item. If items within the reserved recording setup GUI 1940 organically interwork to select a specific item, the other item(s) may be set automatically. For example, if a program item is selected to select a predetermined program, a channel and time of the selected program may be provided automatically even though a channel and a time item are not selected separately. Meanwhile, the reserved recording setup GUI 1940 shown in FIG. 19b is one embodiment, and the present invention is not limited to the reserved recording setup GUI 1940. For example, the reserved recording setup GUI 1940 may be provided in the form of EPG like FIG. 18b. The mobile terminal may set reserved recordings at one time through an application key button 1950 after setting a plurality of reserved recordings or reserved recording of series not reserved recording of one application. In this case, if the reserved recordings are conflict with the preset details, a guide GUI may be provided and the reserved recordings may be processed in accordance with the guide GUI.

Meanwhile, the details applied through the reserved recording setup GUI 1940 may be processed by the digital TV through the control command of the mobile terminal and previously notified prior to the reserved recording time, whereby convenience in use of the user may be provided. If the corresponding channel is not the reserved recording channel or application during the notification, the digital TV may notify switching to the corresponding channel. Also, if the user views an application set by a reserved recording at a reserved recording start time, it is notified that reserved recording has been performed for an application which will be viewed by the user, and a guide GUI for guiding whether to cancel reserved recording setup if the application is to be viewed may be provided. The above notifications may be performed by at least one of the mobile terminal and the digital TV. Meanwhile, if the TV plus application is being executed or installed in a foreground or background at the corresponding time in accordance with each notification or event, a menu item corresponding to the notification or event may be provided automatically even there is no special input. However, in this case, considering the current position of the mobile terminal, application execution status, etc., the aforementioned operation may be performed only in the case that the user of the mobile terminal has no inconvenience in using the mobile terminal. Meanwhile, although not shown, if the digital TV executes an application which is stored or recorded, the mobile terminal may provide a play bar for controlling the application which is being executed through the digital TV even there is no special input of the user. The play bar is only embodiment, and the mobile terminal or the digital TV may automatically provide a menu item suitable for a pattern by performing learning using history data of the user, whereby convenience in use of the user may be enhanced.

FIG. 20 relates to an embodiment for digital TV control through a web launcher. In this case, the web launcher includes a kind of menu launcher for convenience in use of application in the digital device provided with a web OS.

Referring to FIG. 20a, if the digital TV has a web OS platform, the mobile terminal does not need to have the web OS platform necessarily to provide the web launcher. In FIG. 20a, if the digital TV has a web OS platform, the mobile terminal may notify that it may provide the web launcher and provide an icon related to the web launcher when a TV plus application is executed. If the icon is selected, as shown in FIG. 20a, the mobile terminal may provide a web launcher 2010 by overlaying the web launcher 2010 on an execution screen of the application. The web launcher 2010 includes a history part for a previous viewing channel or a previous execution application, and an available application part. The web launcher 2010 is provided on the mobile terminal of FIG. 20a, and if a predetermined application item included in the available application part is selected from the web launcher 2010, the application item may be provided as shown in FIG. 20b. In this case, it is assumed that the selected application item is an application for providing VOD.

If a VOD application is selected in FIG. 20a, a VOD list is provided in FIG. 20b. If a predetermined application is selected from the VOD list, information on the selected application is received from a source device of the VOD application, whereby a VOD content 2020 may be provided as shown in FIG. 20b. If the user finally selects 'apply' after performing selection on VOD purchase, the screen of the digital TV may be provided in such a manner that the purchased VOD content is received from the source device. At this time, payment data for VOD purchase may be provided to the mobile terminal through the digital TV or directly. The purchased VOD content is able to be played immediately on the mobile terminal, and may be played on the digital TV subsequently from the time when the VOD content is played on the mobile terminal as an application key button 2030 is pushed.

Also, in this specification, the mobile terminal does not need to execute the TV plus application in a foreground necessarily, and may execute the TV plus application in a background. Therefore, as described above, in providing a menu, etc., the mobile terminal may provide a predetermined application screen not an application screen, which is currently provided by the digital TV, on the screen. In this case, the mobile terminal may overlay the menu related to the present invention on the application of the mobile terminal or process the menu through split screen.

Meanwhile, in this specification, the digital TV and the mobile terminal are different from each other in screen size or configuration. Therefore, the mobile terminal converts menu data, application data, resolution, etc., which are received from the digital TV, to be suitable for the mobile terminal and provides the converted data. However, the mobile terminal or the digital TV may determine an item selected in a unit of coordinate in case of a touch input for selection of a user with respect to a menu provided on the mobile terminal, and may transmit coordinate data for the selected item and item data according to coordinate to the digital TV and process the data. However, in case of voice, gesture, eye-tracking not the touch input, the input of the user may be converted to be recognized by the digital TV and then processed.

Therefore, according to the aforementioned various embodiments of the present invention, the digital TV may be controlled through the application of the mobile terminal equally or similarly to control of the digital TV through a remote controller. Also, convenience of digital TV control through the mobile terminal of the user may be enhanced by previously identifying a desired function, setup, etc. and applying the desired function, setup, etc. once as well as minimizing interruption of the user who currently watches a content while controlling the digital TV through the application of the mobile terminal not through the remote controller.

MODE FOR CARRYING OUT THE INVENTION

The digital device and the data processing method in the digital device disclosed in this specification are not limited to the aforementioned embodiments, and all or some of the aforementioned embodiments may selectively be configured in combination so that various modifications may be made in the aforementioned embodiments.

Meanwhile, the operation method of the digital device disclosed in this specification may be implemented in a recording medium, which may be read by a processor provided in the digital device, as a code that can be read by the processor. The recording medium that can be read by the processor includes all kinds of recording media in which data that can be read by the processor are stored. Examples of the recording medium include a ROM, a RAM, a CD-ROM, a magnetic tape, a floppy disk, and an optical data memory. Also, another example of the recording medium may be implemented in a shape of carrier wave such as transmission through Internet. Also, the recording medium that can be read by the processor may be distributed in a computer system connected thereto through the network, whereby codes that can be read by the processor may be stored and implemented in a distributive mode.

It will be apparent to those skilled in the art that the present specification can be embodied in other specific forms without departing from the spirit and essential characteristics of the specification. Thus, the above embodiments are to be considered in all respects as illustrative and not restrictive. The scope of the specification should be determined by reasonable interpretation of the appended claims and all change which comes within the equivalent scope of the specification are included in the scope of the specification.

INDUSTRIAL APPLICABILITY

The present invention relates to the digital device, and can be used for overall digital industry.

What is claimed is:

1. A method for processing data in a system including a digital television and a mobile device, the method comprising:
receiving at least one broadcast signal via a tuner in the digital television;
displaying a first broadcast program of a first channel based on the at least one broadcast signal in the digital television;
displaying, at the mobile device, a first menu including at least one menu item for controlling the digital television;
transmitting, from the mobile device to the digital television, a request signal for changing a channel in response to selecting a specific menu item among the at least one menu item included in the first menu displayed at the mobile device;
tuning to a second channel via the tuner included in the digital television based on the request signal for changing the channel;
transmitting, from the digital television to the mobile device, video data corresponding to the second broadcast program and displaying at the digital television a second broadcast program of the second channel without displaying the first menu while the mobile device displays the video data corresponding to the second broadcast program in a full screen together with the first menu;
receiving another video data via an external device interface of the digital television and displaying the another video data at the digital television; and
automatically displaying, at the mobile device, the another video data in a full screen together with a second menu different than the first menu while the another video data is displayed on the digital television without the second menu.

2. The method of claim 1, wherein the mobile terminal is in wireless communication with a specific server, the request signal for changing the channel is transmitted to the digital television via the specific server, and the video data is also transmitted to the mobile device via the specific server.

3. The method of claim 2, wherein a pairing request is automatically transmitted from the mobile device to the digital television after a specific application for controlling the digital television is executed in the mobile device.

4. The method of claim 3, wherein communication between the digital television and the mobile device is based on Bluetooth, Wi-Fi, or Wi-Fi direct protocols.

5. A system for processing data, the system comprising:
a digital television having a tuner and an external device interface; and
a mobile device configured to communicate with at least one of the digital television or a specific server wirelessly,
wherein the digital television is configured to display a first broadcast program of a first channel,
wherein the mobile device is configured to display a first menu including at least one menu item for controlling the digital television,
wherein the mobile device is configured to transmit, to the digital television, a request signal for changing a channel in response to selecting a specific menu item among the at least one menu item included in the first menu,
wherein the digital television is configured to tune to a second channel via the tuner included in the digital television based on the request signal for changing the channel,
wherein the digital television is configured to transmit video data corresponding to the second broadcast program to the mobile device and display a second broadcast program of the second channel without displaying the first menu while the mobile device displays the video data corresponding to the second broadcast program in a full screen together with the first menu,
wherein the digital television is configured to receive another video data via the external device interface and display the another video data, and
wherein the mobile device is configured to automatically display the another video data in a full screen together with a second menu different than the first menu while the another video data is displayed on the digital television without the second menu.

* * * * *